US012695846B2

(12) United States Patent
Zuo

(10) Patent No.: US 12,695,846 B2
(45) Date of Patent: Jul. 28, 2026

(54) VIDEO PROCESSING METHOD AND APPARATUS, COMPUTER, AND READABLE STORAGE MEDIUM

(71) Applicant: TENCENT TECHNOLOGY (SHENZHEN) COMPANY LIMITED, Shenzhen (CN)

(72) Inventor: Hongtao Zuo, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 201 days.

(21) Appl. No.: 18/438,615

(22) Filed: Feb. 12, 2024

(65) Prior Publication Data

US 2024/0214521 A1 Jun. 27, 2024

Related U.S. Application Data

(63) Continuation of application No. PCT/CN2023/085843, filed on Apr. 3, 2023.

(30) Foreign Application Priority Data

Oct. 20, 2022 (CN) .......................... 202211292011.2

(51) Int. Cl.
*H04N 7/15* (2006.01)
*G06V 10/56* (2022.01)
(52) U.S. Cl.
CPC ............. *H04N 7/152* (2013.01); *G06V 10/56* (2022.01); *H04N 7/155* (2013.01)
(58) Field of Classification Search
CPC .... H04N 7/152; H04N 7/155; H04N 21/2187; H04N 21/2343; H04N 21/44008;
(Continued)

(56) References Cited

U.S. PATENT DOCUMENTS

2020/0288111 A1* 9/2020 Sheng .................. H04N 13/167
2023/0199237 A1* 6/2023 Takabayashi ........ H04N 21/218
725/109
(Continued)

FOREIGN PATENT DOCUMENTS

CN 103686047 A 3/2014
CN 106331822 A 1/2017
(Continued)

OTHER PUBLICATIONS

The World Intellectual Property Organization (WIPO) International Search Report for PCT/CN2023/085843 Jul. 26, 2023 7 Pages (including translation).

*Primary Examiner* — Stella L. Woo
(74) *Attorney, Agent, or Firm* — Anova Law Group, PLLC

(57) ABSTRACT

A video processing method includes: obtaining video stream data from N video acquisition devices, N being a positive integer, and each video acquisition device corresponding to one visual angle; stitching N pieces of video stream data into a video synthesis picture based on region division information for video picture synthesis, the region division information indicating locations of the N pieces of video stream data in the video synthesis picture; and transmitting the video synthesis picture to a participating client, to enable the participating client to split the video synthesis picture into the N pieces of video stream data based on the region division information, and perform synchronous rendering on the N pieces of video stream data based on video display region information corresponding to the participating client.

20 Claims, 9 Drawing Sheets

(58) Field of Classification Search
CPC ....... H04N 21/21805; H04N 21/44012; H04N
21/4307; H04N 21/44016; G06V 10/56
See application file for complete search history.

(56) References Cited

U.S. PATENT DOCUMENTS

| | | | |
|---|---|---|---|
| 2023/0217047 A1 | 7/2023 | Chang et al. | |
| 2023/0370624 A1* | 11/2023 | Meardi | H04N 19/164 |
| 2023/0379554 A1* | 11/2023 | Potetsianakis | H04N 13/117 |
| 2024/0040259 A1* | 2/2024 | Tsai | H04N 7/181 |
| 2024/0121455 A1* | 4/2024 | Chen | H04N 21/6587 |
| 2024/0314454 A1* | 9/2024 | Nakai | H04N 23/90 |
| 2024/0386867 A1* | 11/2024 | Cai | H04N 21/440281 |

FOREIGN PATENT DOCUMENTS

| | | | |
|---|---|---|---|
| CN | 107205158 A | 9/2017 | |
| CN | 108271033 A | 7/2018 | |
| CN | 111447457 A | 7/2020 | |
| CN | 112929580 A | 6/2021 | |
| CN | 113259764 A | 8/2021 | |
| CN | 113497963 A | 10/2021 | |
| CN | 113518260 A | 10/2021 | |
| CN | 114257760 A | 3/2022 | |
| JP | 2014116868 A | 6/2014 | |
| WO | 2019118890 A1 | 6/2019 | |
| WO | 2022055198 A1 | 3/2022 | |

* cited by examiner

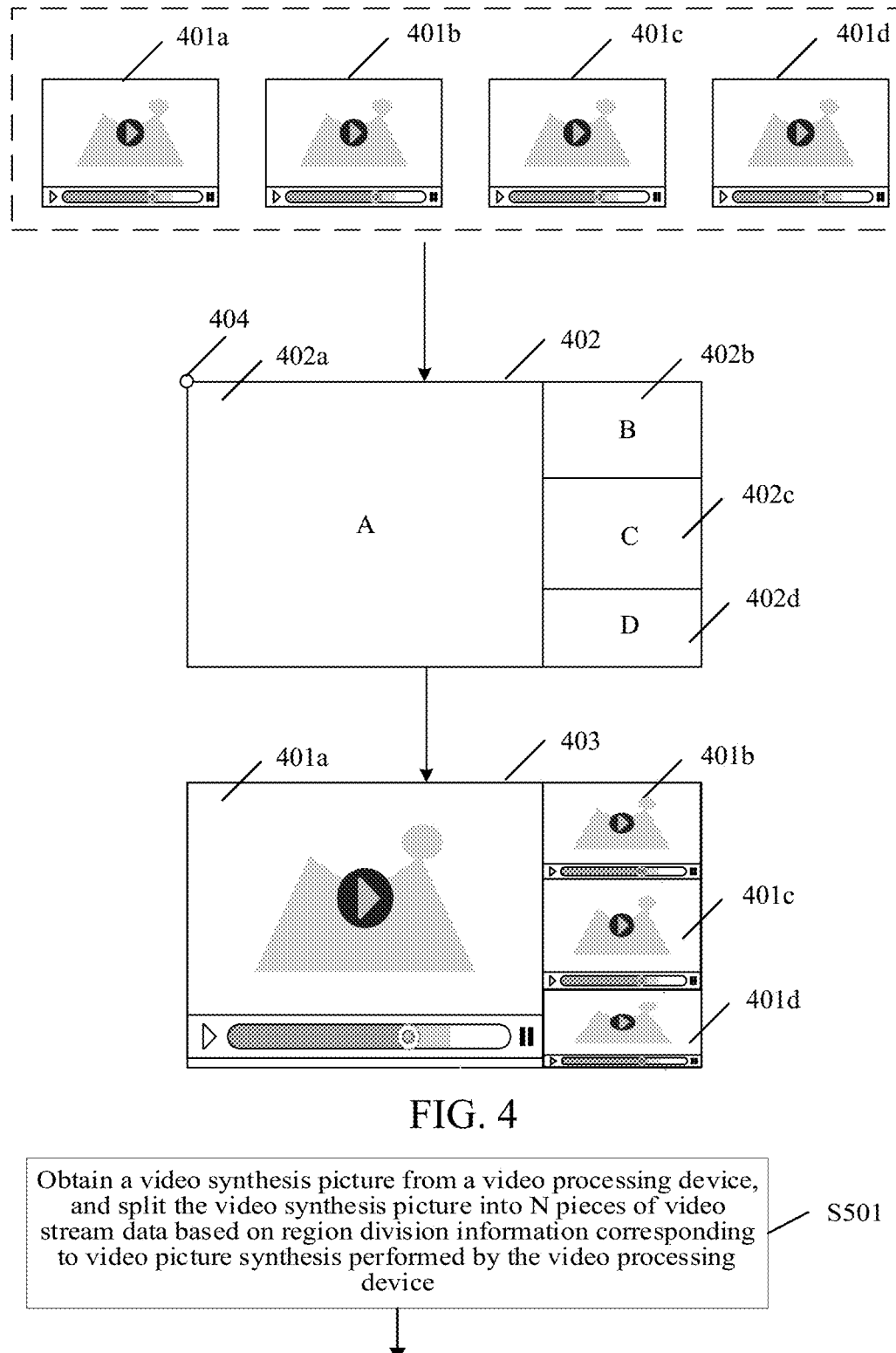

FIG. 4

Obtain a video synthesis picture from a video processing device, and split the video synthesis picture into N pieces of video stream data based on region division information corresponding to video picture synthesis performed by the video processing device    S501

Perform synchronous rendering on the N pieces of video stream data based on the region division information    S502

VIDEO PROCESSING METHOD AND APPARATUS, COMPUTER, AND READABLE STORAGE MEDIUM

CROSS-REFERENCES TO RELATED APPLICATIONS

This application is a continuation application of PCT Patent Application No. PCT/CN2023/085843, filed on Apr. 3, 2023, which claims priority to Chinese Patent Application No. 202211292011.2, entitled "VIDEO PROCESSING METHOD AND APPARATUS, COMPUTER, READABLE STORAGE MEDIUM, AND PROGRAM PRODUCT", filed with the China National Intellectual Property Administration on Oct. 20, 2022, both of which are incorporated by reference in their entirety.

FIELD OF THE TECHNOLOGY

The present disclosure relates to the field of computer technologies, and in particular, to a video processing technology.

BACKGROUND OF THE DISCLOSURE

With the rise of the livestreaming industry, more livestreaming applications and types have emerged. Livestreams at multiple visual angles may often occur. For example, in a show, cameras may be deployed at multiple visual angles such as a backstage, a main stage, and some other area to perform video acquisition at the multiple visual angles, to enable a user to view pictures at different visual angles. Alternatively, in livestreaming events of multiple targets, cameras may be deployed at visual angles of the multiple targets to perform video acquisition at the multiple visual angles. In other words, video playing at multiple visual angles has become an emerging technology. Currently, generally, multiple cameras acquire respective video streams and push the video streams to a backend, the backend codes each video stream separately and outputs playable video streams, and a viewing end launches multiple video players to pull playable video streams at different visual angles for playing.

Because playable video streams at multiple visual angles are acquired independently, the multiple video players need to respectively play the video streams at the different visual angles. Due to factors such as backend storage, a network, caching strategies, and synchronization strategies, the video players often fail to implement synchronous playing of videos at the multiple visual angles, resulting in low overall video display fluency and poor time synchronization between different videos.

SUMMARY

Embodiments of the present disclosure provide a video processing method and apparatus, a computer, a readable storage medium, and a program product, to synchronously play multiple videos, and improve display fluency of the multiple videos and time synchronization between the multiple videos.

An aspect of embodiments of the present disclosure provides a video processing method, performed by a video processing device, and including: obtaining video stream data from N video acquisition devices, N being a positive integer, and each video acquisition device corresponding to one visual angle; stitching N pieces of video stream data into a video synthesis picture based on region division information for video picture synthesis, the region division information indicating locations of the N pieces of video stream data in the video synthesis picture; and transmitting the video synthesis picture to a participating client, to enable the participating client to split the video synthesis picture into the N pieces of video stream data based on the region division information, and perform synchronous rendering on the N pieces of video stream data based on video display region information corresponding to the participating client.

An aspect of the embodiments of the present disclosure provides a video processing method, performed by a participating client, and including: obtaining a video synthesis picture from a video processing device, and splitting the video synthesis picture into N pieces of video stream data based on region division information corresponding to video picture synthesis performed by the video processing device, N being a positive integer, the region division information indicating locations of the N pieces of video stream data in the video synthesis picture, the video synthesis picture being obtained by stitching the N pieces of video stream data by the video processing device based on the region division information, the N pieces of video stream data being obtained from N video acquisition devices, and each acquisition device corresponding to one visual angle; and performing synchronous rendering on the N pieces of video stream data based on video display region information.

An aspect of the embodiments of the present disclosure provides a video processing apparatus, deployed on a video processing device, and including: a video obtaining module, configured to obtain video stream data from N video acquisition devices, N being a positive integer, and each video acquisition device corresponding to one visual angle; a data stitching module, configured to stitch N pieces of video stream data into a video synthesis picture based on region division information used for performing video picture synthesis, the region division information indicating locations of the N pieces of video stream data in the video synthesis picture; and a video transmission module, configured to transmit the video synthesis picture to a participating client, to enable the participating client to split the video synthesis picture into the N pieces of video stream data based on the region division information, and perform synchronous rendering on the N pieces of video stream data based on video display region information corresponding to the participating client.

An aspect of the embodiments of the present disclosure provides a video processing apparatus, deployed on a participating client, and including: a video receiving module, configured to: obtain a video synthesis picture from a video processing device, and split the video synthesis picture into N pieces of video stream data based on region division information corresponding to video picture synthesis performed by the video processing device, N being a positive integer, the region division information indicating locations of the N pieces of video stream data in the video synthesis picture, the video synthesis picture being obtained by stitching the N pieces of video stream data by the video processing device based on the region division information, the N pieces of video stream data being obtained from N video acquisition devices, and each video acquisition device corresponding to one visual angle; and a video output module, configured to perform synchronous rendering on the N pieces of video stream data based on video display region information.

An aspect of the embodiments of the present disclosure provides a computer device, including a processor, a memory, and an input/output interface; and the processor being separately connected to the memory and the input/output interface, the input/output interface being configured to receive data and output data, the memory being configured to store a computer program, and the processor being configured to invoke the computer program, to enable the computer device that includes the processor to perform the video processing method according to the aspect of the embodiments of the present disclosure.

An aspect of the embodiments of the present disclosure provides a non-transitory computer-readable storage medium, storing a computer program, the computer program being applied to be loaded and executed by a processor, to enable a computer device that includes the processor to perform the video processing method according to the aspect of the embodiments of the present disclosure.

The embodiments of the present disclosure achieve the following beneficial effects:

In the embodiments of the present disclosure, the video stream data is obtained from the N video acquisition devices, N being a positive integer, and each video acquisition device corresponding to one visual angle. Then, the N pieces of video stream data are stitched into the video synthesis picture based on the region division information used for performing video picture synthesis, the region division information indicating the locations of the N pieces of video stream data in the video synthesis picture. In this manner, video stream data at multiple visual angles (that is, the video acquisition devices) can be synchronously obtained, and the video stream data obtained at each visual angle is synthesized to obtain the video synthesis picture. This is equivalent to describing that multiple channels of bit streams are synthesized into a channel of bit stream, so that it may be considered that the video stream data at each visual angle in the video synthesis picture is obtained at the same moment. The video synthesis picture is sent to the participating client, and the participating client can obtain the video stream data at each visual angle by obtaining the video synthesis picture. In this way, the participating client can split the video synthesis picture into the N pieces of video stream data based on the region division information, and perform synchronous rendering on the N pieces of video stream data based on the video display region information corresponding to the participating client. Therefore, videos at the multiple visual angles are synchronously played, and display fluency of the multiple videos and time synchronization between the multiple videos are improved.

BRIEF DESCRIPTION OF THE DRAWINGS

To describe the technical solutions in the embodiments of the present disclosure more clearly, the following briefly describes the accompanying drawings required for describing the embodiments. It is clear that the accompanying drawings in the following descriptions show only some embodiments of the present disclosure.

FIG. 4 is a schematic diagram of a video synthesis scenario according to an embodiment of the present disclosure.

FIG. 5 is a flowchart of another video processing method according to an embodiment of the present disclosure.

DESCRIPTION OF EMBODIMENTS

The technical solutions in the embodiments of the present disclosure are clearly and completely described below with reference to the accompanying drawings of the embodiments of the present disclosure. It is clear that, the described embodiments are only some rather than all of the embodiments of the present disclosure. Based on the embodiments in the present disclosure, all other embodiments obtained by a person ordinary skill in the art without creative efforts all fall within the protection scope of the present disclosure.

Figure 1:
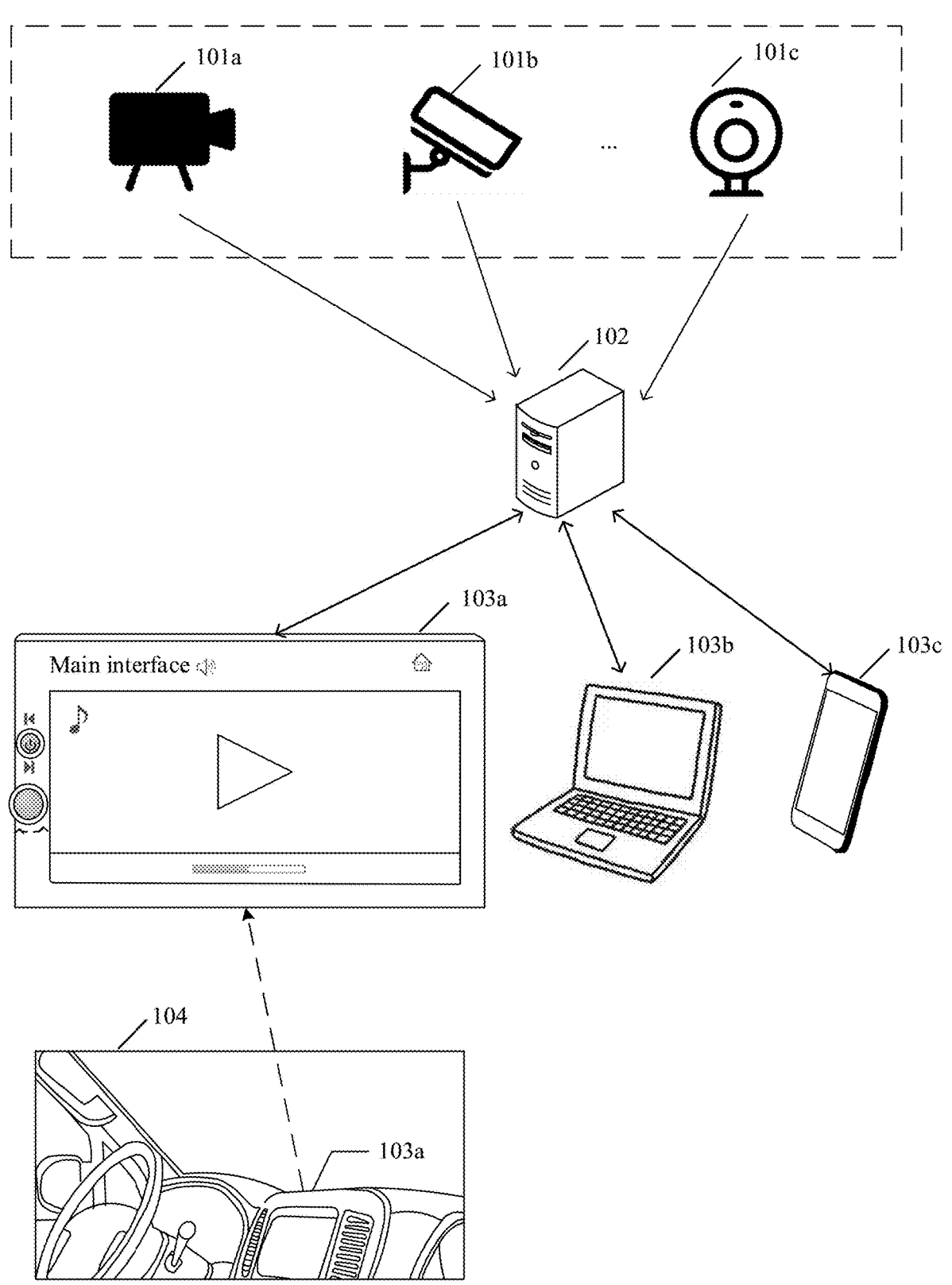
FIG. 1 is a diagram of a network interaction architecture for video processing according to an embodiment of the present disclosure.

In an embodiment of the present disclosure, FIG. 1 is a diagram of a network interaction architecture for video processing according to an embodiment of the present disclosure. As shown in FIG. 1, N video acquisition devices may be deployed. N is a positive integer, and each video acquisition device corresponds to one visual angle. As shown in FIG. 1, the N video acquisition devices may include, for example, a video acquisition device 101a, a video acquisition device 101b, and a video acquisition device 101c. Each video acquisition device may be deployed at a different visual angle and configured to acquire video stream data at the corresponding visual angle. The video stream data may be directly played by a user after being coded by a backend. It may be considered that the video stream data is equivalent to a video link, and the video stream data includes multimedia information such as a video picture and sound. A video processing device 102 may obtain the video stream data from the N video acquisition devices, and stitch N pieces of video stream data for synthesis, to obtain a video synthesis picture and integrate synchronous pictures at the multiple visual angles in the video synthesis picture. This is equivalent to describing that multiple channels of bit streams are synthesized into a channel of bit stream. The video processing device 102 may transmit the video synthesis picture to a participating client. There may be one participating client or at least two participating clients, for example a participating client 103a, a participating client 103b, and a participating client 103c shown in FIG. 1. Each participating client may split the video synthesis picture based on the obtained video synthesis picture, to obtain the N pieces of video stream data, namely, the synchronous pictures at the visual angles, and further perform synchronous rendering on the N pieces of video stream data, so that rendered pictures at the visual angles are synchronous, to improve display fluency of multiple videos and time synchronization between the multiple videos. The multiple visual angles may mean that the multiple channels of bit streams exist in the same livestreaming (where generally in the same scene, different video acquisition devices perform shooting at different angles), so that in terms of a product form, a user can view pictures at the multiple visual angles at the same time.

Figure 2:
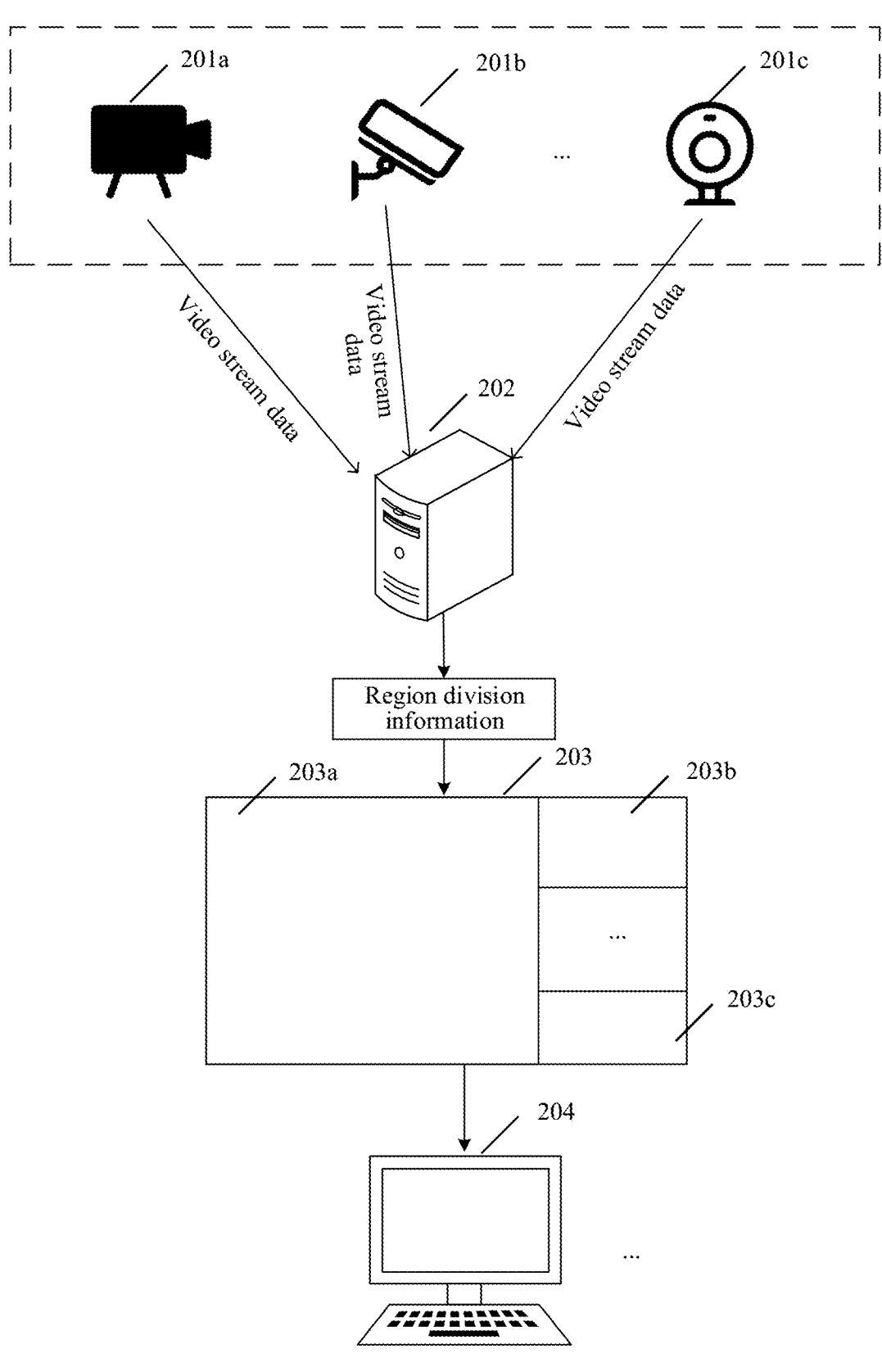
FIG. 2 is a schematic diagram of a video processing scenario according to an embodiment of the present disclosure.

FIG. 2 is a schematic diagram of a video processing scenario according to an embodiment of the present disclosure. As shown in FIG. 2, N video acquisition devices (for example, a video acquisition device 201*a*, a video acquisition device 201*b*, and a video acquisition device 201*c* shown in FIG. 2) may acquire video stream data. In the acquisition process, it may be considered that real-time acquisition is performed. In other words, the video stream data may be acquired in real time, so that a picture at each visual angle may be acquired and played. A video processing device 202 may obtain the video stream data from the N video acquisition devices, and stitch N pieces of video stream data into a video synthesis picture 203 based on region division information. It may be considered that the video synthesis picture 203 includes a video region 203*a*, a video region 203*b*, a video region 203*c*, and the like. The region division information indicates a visual angle at which video stream data that needs to be stitched in each video region. For example, the video region 203*a* is associated with a visual angle 1 of the video acquisition device 201*a*, the video region 203*b* is associated with a visual angle 2 of the video acquisition device 201*b*, and the video region 203*c* is associated with a visual angle 3 of the video acquisition device 201*c*. In other words, in this example, in the video synthesis picture 203, the video region 203*a* is used for displaying video stream data acquired by the video acquisition device 201*a*, the video region 203*b* is used for displaying video stream data acquired by the video acquisition device 201*b*, and the video region 203*c* is used for displaying video stream data acquired by the video acquisition device 201*c*. The video processing device 202 may transmit the video synthesis picture 203 to a participating client 204. There may be one participating client 204 or at least two participating clients 204. The participating client 204 may split the video synthesis picture 203 based on the region division information, to obtain the N pieces of video stream data and further obtain a synchronous picture at the visual angle of each video acquisition device. The participating client 204 may perform synchronous rendering on the N pieces of video stream data based on a requirement, to synchronously play multiple videos, and improve overall display fluency of the multiple videos and time synchronization between the multiple videos.

It may be understood that the video acquisition device may be a device for acquiring video stream data, for example a camera. The video processing device or the participating client mentioned in embodiments of the present disclosure may be a computer device. The computer device in the embodiments of the present disclosure includes but is not limited to a terminal device or a server. In other words, the computer device may be the server or the terminal device, or may be a system including the server and the terminal device. The foregoing terminal device may be an electronic device, including but not limited to a mobile phone (for example, the participating client 103*c* shown in FIG. 1), a tablet computer, a desktop computer, a laptop computer (for example, the participating client 103*b* shown in FIG. 1), a palmtop computer, a vehicle-mounted device (for example, the participating client 103*a* shown in FIG. 1), an augmented reality/virtual reality (AR/VR) device, a head mounted display, a wearable device, a smart speaker, a smart TV, a digital camera, a camera, another mobile internet device (MID) having a network access capability, and the like. In some embodiments, the participating client 103*a* may be a device in a vehicle 104. The foregoing server may be an independent physical server, or a server cluster or a distributed system including multiple physical servers, or a cloud server that provides a basic cloud computing service such as a cloud service, a cloud database, cloud computing, a cloud function, cloud storage, a network service, cloud communication, a middleware service, a domain name service, a security service, a content delivery network (CDN), big data, and an artificial intelligence platform. The participating client has a video playing function.

The data involved in the embodiments of the present disclosure may be stored in the computer device, or may be stored based on a cloud storage technology or a blockchain network. This is not limited herein.

Figure 3:
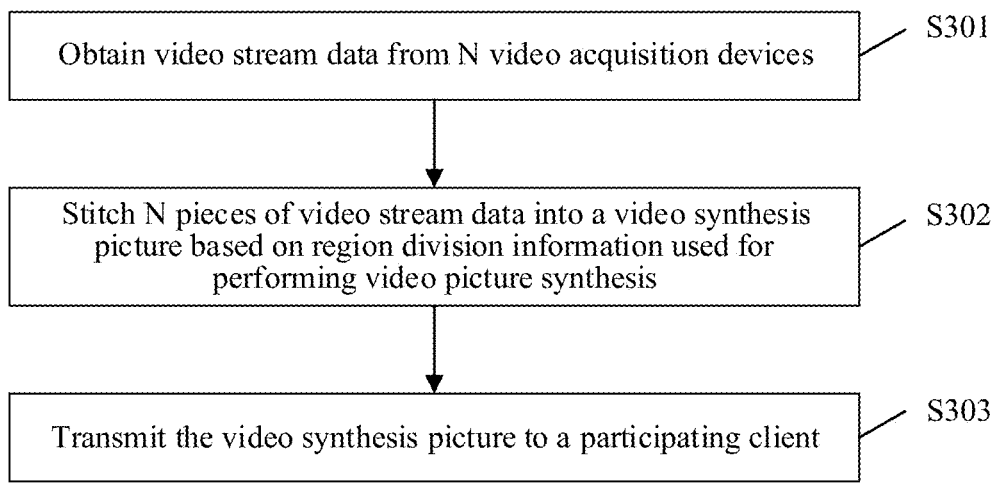
FIG. 3 is a flowchart of a video processing method according to an embodiment of the present disclosure.

FIG. 3 is a flowchart of a video processing method according to an embodiment of the present disclosure. As shown in FIG. 3, an example in which a video processing device is used as an execution body is used for description. In other words, in the method embodiment described in FIG. 3, the video processing process includes the following steps:

S301: Obtain video stream data from N video acquisition devices.

In this embodiment of the present disclosure, the video processing device may obtain the video stream data from the N video acquisition devices. The N video acquisition devices may acquire the video stream data in real time. When acquiring the video stream data, the N video acquisition devices may push the acquired video stream data to the video processing device. The video processing device receives the video stream data pushed by the N video acquisition devices. Alternatively, the video processing device may obtain the video stream data from the N video acquisition devices.

In different cases, in S301, the video stream data may be obtained from the N video acquisition devices in different manners.

In a case, the video processing device may synthesize a video synthesis picture periodically. Specifically, a video playing frame rate may be obtained, and a video frame switching periodicity may be determined based on the video playing frame rate. The video playing frame rate is a quantity of frames transmitted per second when a video is played. Time required for switching between frames, that is, the video frame switching periodicity, may be determined based on the video playing frame rate. For example, if a required video playing frame rate is 25 frames per second (fps), one frame is switched per 40 milliseconds (ms) for the video. In other words, the video frame switching periodicity may be considered as 40 ms. In some embodiments, the video frame switching periodicity may also be obtained. The video frame switching periodicity may be a default video frame switching periodicity or a video frame switching periodicity provided manually.

In this case, when obtaining the video stream data from the N video acquisition devices, the video processing device may delete historical video stream data associated with the N video acquisition devices and associate and store N pieces of video stream data and the N video acquisition devices within the video frame switching periodicity, in response to receiving the video stream data sent by the N video acquisition devices. When a video frame switching condition indicated by the video frame switching periodicity is satisfied, the video processing device may obtain video stream data that is associated with the N video acquisition devices when the video frame switching condition is satisfied, and perform S302 for the video stream data that is associated with the N video acquisition devices when the video frame switching condition is satisfied. In short, when acquiring the video stream data, the N video acquisition devices push the video stream data to the video processing device. N channels may be considered to exist in the video processing device and each channel stores one frame of video stream data. When the video processing device receives the video stream data pushed by the N video acquisition devices, each time the video processing device receives one frame of video stream data, the video processing device may overwrite a previous frame of video stream data (that is, the historical video stream data) corresponding to each video acquisition device, so that a channel corresponding to each video acquisition device stores latest video stream data. When the video frame switching condition indicated by the video frame switching periodicity is satisfied, that is, a time interval between current system network time and time when the video synthesis picture is last synthesized reaches the video frame switching periodicity, the video processing device may perform S302 for video stream data currently associated with the N video acquisition devices. In one embodiment, the N video acquisition devices may push the video stream data to the video processing device every video frame switching periodicity. The video processing device may receive the video stream data pushed by the N video acquisition devices.

In a case, the video processing device may synthesize the video synthesis picture when triggered by a primary device. Specifically, the video processing device may obtain a default video acquisition device and determine the default video acquisition device as the primary device. Alternatively, the video processing device may obtain device acquisition information and coverage regions corresponding to the N video acquisition devices and determine, based on the device acquisition information and the coverage regions corresponding to the N video acquisition devices, the primary device in the N video acquisition devices. The device acquisition information may include but is not limited to acquisition resolution, device quality, and the like of a corresponding video acquisition device. The coverage region represents a visual angle corresponding to the corresponding video acquisition device, that is, a region acquired. For example, a coverage region corresponding to a video acquisition device deployed in a main stage may be considered to be the main stage. Better performance indicated by device acquisition information of a video acquisition device indicates higher importance of a coverage region and higher importance of the video acquisition device, so that the video acquisition device is more likely used as the primary device. For example, in a program, generally a main stage is a main viewing scene for audience, so that a video acquisition device deployed in the main stage (that is, a coverage region is the main stage) may be determined as the primary device. Alternatively, multiple coverage regions are balanced. In a case of video acquisition devices that acquire video streams for multiple livestreaming objects (for example, anchors), livestreaming traffic and the like of a coverage region of each video acquisition device may be obtained, and the primary device may be determined from the N video acquisition devices based on the livestreaming traffic and the like of the coverage region of each video acquisition device. Certainly, another manner of determining the primary device is not limited in the present disclosure, and another parameter or the like for determining the primary device may be added or changed based on a requirement.

In this case, when obtaining the video stream data from the N video acquisition devices, the video acquisition device may obtain video stream data from a video acquisition device other than the primary device in the N video acquisition devices when receiving video stream data sent by the primary device. In other words, when receiving the video stream data sent by the primary device, the video acquisition device actively obtains video stream data acquired by another video acquisition device, to synchronously acquire video streams at multiple visual angles (that is, video streams of multiple video acquisition devices) and implement time synchronization between videos at the multiple visual angles.

In another case, the video processing device may establish data connections to the N video acquisition devices, and determine, based on data transmission losses corresponding to the data connections and media streaming manners, a target media streaming manner from the media streaming manners. For example, the data connection corresponds to a connection bandwidth, a data transmission rate, and the like. The media streaming manners may include but are not limited to a real-time messaging protocol (RTMP), a real-time streaming protocol (RTSP), an HTTP live streaming (HLS) protocol, and the like. The target media streaming manner may be determined from the media streaming manners based on the data transmission losses corresponding to the data connections and the media streaming manners. Further, the target media streaming manner is sent to the N video acquisition devices. For example, if the target media streaming manner is RTMP, RTMP is sent to the N video acquisition devices, so that the N video acquisition devices determine a streaming manner for the video processing device. In this case, when obtaining the video stream data from the N video acquisition devices, the video processing device may obtain video stream data that is sent by the N video acquisition devices based on the target media streaming manner. Each video acquisition device may push the video stream data to the video processing device in the same media streaming manner (that is, the target media streaming manner), to improve streaming synchronization of each video acquisition device and further improve time synchronization between multiple videos. In other words, in one embodiment, during pushing of the video stream data in this step, each video acquisition device may use the target media streaming manner to push the video stream data to the video processing device.

S302: Stitch the N pieces of video stream data into a video synthesis picture based on region division information used for performing video picture synthesis.

In this embodiment of the present disclosure, the region division information indicates locations of the N pieces of video stream data in the video synthesis picture. In one embodiment, the region division information includes video region locations corresponding to the N video acquisition devices. The video processing device may stitch the video stream data corresponding to the video acquisition devices into the video synthesis picture based on the video region locations corresponding to the N video acquisition devices. A region of the video stream data corresponding to each video acquisition device in the video synthesis picture is a region indicated by the video region location of the video acquisition device. Specifically, the region division information indicates a participating client to determine, based on the video region location corresponding to each video acquisition device, the video stream data corresponding to the N video acquisition devices. Each video acquisition device corresponds to one visual angle. The visual angle corresponding to each video acquisition device indicates the participating client to perform synchronous rendering on the N pieces of video stream data. In other words, the participating client may determine, based on the visual angle corresponding to each video acquisition device, video stream data corresponding to each visual angle and further output the corresponding video stream data at a visual angle for display, to implement synchronous rendering on the N pieces of video stream data.

The video processing device may stitch the video stream data corresponding to the N video acquisition devices into the video synthesis picture based on the video region locations corresponding to the N video acquisition devices. A stitching manner may be any video stream stitching manner. This is not limited herein.

Alternatively, the video processing device may obtain image data and audio data that are included in each piece of video stream data, and stitch the image data included in the N pieces of video stream data into a synthetic image based on the video region locations corresponding to the N video acquisition devices. The video processing device may associate the audio data corresponding to N pieces of image data with the N pieces of image data in the synthetic image, to obtain the video synthesis picture. One piece of video stream data is obtained after each piece of audio data is associated with corresponding image data. That is, video stream data obtained after any piece of audio data is associated with image data corresponding to the audio data belongs to the N pieces of video stream data (for example, one piece of associated video stream data obtained after a piece of audio data is associated with corresponding image data is the same as one of the N pieces of video stream data). In other words, the video processing device may separately stitch the image data and the audio data and then synthesize the data, to obtain the video synthesis picture.

For example, FIG. 4 is a schematic diagram of a video synthesis scenario according to an embodiment of the present disclosure. As shown in FIG. 4, the video processing device receives the N pieces of video stream data. As shown in FIG. 4, if N is 4, the N pieces of video stream data may include video stream data 401*a* acquired by a video acquisition device 1, video stream data 401*b* acquired by a video acquisition device 2, video stream data 401*c* acquired by a video acquisition device 3, and video stream data 401*d* acquired by a video acquisition device 4. Region division information used for video picture synthesis is obtained. For example, the region division information may be a region division template 402 shown in FIG. 4, or may be represented by text information. This is not limited herein. As shown in FIG. 4, the region division template 402 may include a video region 402*a* (that is, a region A) corresponding to the video acquisition device 1, a video region 402*b* (that is, a region B) corresponding to the video acquisition device 2, a video region 402*c* (that is, a region C) corresponding to the video acquisition device 3, and a video region 402*d* (that is, a region D) corresponding to the video acquisition device 4. In some embodiments, the correspondence may be described by using a device identifier of each video acquisition device. Certainly, the region division template 402 is only an example. Locations, sizes, and the like of the video regions included in the region division template 402 may be updated based on a requirement. Further, the video stream data 401*a* may be stitched to the video region 402*a*, the video stream data 401*b* may be stitched to the video region 402*b*, the video stream data 401*c* may be stitched to the video region 402*c*, and the video stream data 401*d* may be stitched to the video region 402*d*, to obtain a video synthesis picture 403.

For example, there are four shooting locations: A, B, C, and D. In other words, if N is 4, a device identifier of the video acquisition device 1 is A, a device identifier of the video acquisition device 2 is B, a device identifier of the video acquisition device 3 is C, and a device identifier of the video acquisition device 4 is D. Video stream data at the four shooting locations may be coded into each video region. For example, the region A is used for coding the video stream data at the shooting location A, the region B is used for coding the video stream data at the shooting location B, the region C is used for coding the video stream data at the shooting location C, and the region D is used for coding the video stream data at the shooting location D. The region division information includes the video region locations corresponding to the N video acquisition devices. The video region locations may include lengths, widths, start point locations, and the like of corresponding video regions. For example, an upper left corner (a point 404 shown in FIG. 4) is used as a start point, in other words, the upper left corner is used as an origin, a right direction is used as an x-axis direction, and a downward direction is used as a y-axis direction. In this case, the region division information may include a video region location of the region A: "length: 1920; width: 1080; start-point x coordinate: 0; start-point y coordinate: 0", a video region location of the region B: "length: 940; width: 360; start-point x coordinate: 1920; start-point y coordinate: 0", a video region location of the region C: "length: 940; width: 360; start-point x coordinate: 1920; start-point y coordinate: 360", and a video region location of the region D: "length: 940; width: 360; start-point x coordinate: 1920; start-point y coordinate: 720". The foregoing is an example video region division manner. The region division information may alternatively be determined based on another start point, another x-axis direction, and another y-axis direction. In other words, that the region division information includes the video region locations corresponding to the N video acquisition devices may be considered as that the region division information includes N association relationships. Each association relationship may be (device identifier, video region location), representing a video region location and the like of the video acquisition device corresponding to the device identifier.

S303: Transmit the video synthesis picture to a participating client.

In this embodiment of the present disclosure, the video processing device transmits the video synthesis picture to the participating client, to enable the participating client to split the video synthesis picture into the N pieces of video stream data based on the region division information, and perform synchronous rendering on the N pieces of video stream data based on video display region information corresponding to the participating client. If region division information for generating the video synthesis picture this time is not synchronized to the participating client, in other words, the participating client does not have the region division information for generating the video synthesis picture this time, the video processing device may further transmit the region division information to the participating client when transmitting the video synthesis picture to the participating client.

In one embodiment, the video processing device may transmit the video synthesis picture to the participating client. Alternatively, the video processing device may code the video synthesis picture, to obtain video synthesis coded data corresponding to the video synthesis picture, and transmit the video synthesis coded data to the participating client. A manner of coding the video synthesis picture may be any video stream coding manner. This is not limited herein. Alternatively, the video processing device may obtain image synthesis data and audio synthesis data that form the video synthesis picture, perform image coding processing on the image synthesis data, to obtain image coded data, perform audio coding processing on the audio synthesis data, to obtain audio coded data, form the video synthesis coded data by using the image coded data and the audio coded data, and transmit the video synthesis coded data to the participating client. An image coding manner of the image synthesis data may be any image coding manner such as a Huffman coding manner, a predictive coding manner, or a transform coding manner. An audio coding manner of the audio synthesis data may be any audio coding manner such as a waveform coding manner, a parameter coding manner, or a hybrid coding manner. This is not limited herein.

In one embodiment, in S303, a manner of transmitting the video synthesis picture to the participating client may be as follows: The video processing device obtains the image synthesis data and the audio synthesis data that form the video synthesis picture. The video processing device obtains d pixels and pixel color value information corresponding to each pixel that are included in the image synthesis data, and obtains color value difference data between pixel color value information corresponding to every two adjacent pixels, the every two adjacent pixels being every two adjacent pixels in the d pixels, and d being a positive integer. The color value difference data represents a difference between pixel color value information corresponding to two corresponding adjacent pixels. Then the video processing device may divide the d pixels into k pixel sets based on the color value difference data between the pixel color value information corresponding to every two adjacent pixels, k being a positive integer less than or equal to d, and pixels included in each pixel set being consecutive in the image synthesis data. To be specific, if color value difference data between pixel color value information of an $i^{th}$ pixel and pixel color value information of an $(i+1)^{th}$ pixel is greater than or equal to a difference threshold, a pixel breakpoint is added between the $i^{th}$ pixel and the $(i+1)^{th}$ pixel, i being a positive integer less than d. If the color value difference data between the pixel color value information of the $i^{th}$ pixel and the pixel color value information of the $(i+1)^{th}$ pixel is less than the difference threshold, the $(i+1)^{th}$ pixel is determined as the $i^{th}$ pixel, and the process of comparing the color value difference data between the pixel color value information of the $i^{th}$ pixel and the pixel color value information of the $(i+1)^{th}$ pixel and the difference threshold is performed, that is, next piece of color value difference data is performed, until the d pixels are all traversed, that is, i+1 is d, to obtain an existing pixel breakpoint in the d pixels. The d pixels are divided into the k pixel sets based on the existing pixel breakpoint in the d pixels.

Then, the video processing device form, by using pixel color value information of a second pixel in each pixel set and color value difference data between a first pixel and a previous pixel of the first pixel, the image coded data corresponding to the image synthesis data, the second pixel being a leading pixel (i.e., a foremost pixel, a pixel at the first/beginning place) in a corresponding pixel set, and the first pixel being a pixel other than the second pixel in each pixel set. Using a $j^{th}$ pixel set as an example, j being a positive integer less than or equal to k, a set coded data of the $j^{th}$ pixel set is formed by using pixel color value information of a second pixel in the $j^{th}$ pixel set and color value difference data between a first pixel in the $j^{th}$ pixel set and a previous pixel of the first pixel, until set coded data corresponding to the k pixel sets is obtained, and the image coded data is formed by using the set coded data corresponding to the k pixel sets. In one embodiment, a set space mark may be added between the pixel sets, to represent a start of one pixel set.

Then, the audio coding processing may be performed on the audio synthesis data, to obtain the audio coded data. The video synthesis coded data formed by the image coded data and the audio coded data is transmitted to the participating client, to enable the participating client to perform a decoding operation on the video synthesis coded data, to obtain the video synthesis picture.

The video processing device transmits the video synthesis picture to the participating client. The participating client needs to split the video synthesis picture. That is, the participating client needs to maintain the same region division information with the video processing device. Therefore, for example, when generating new region division information or updating the region division information, the video processing device needs to synchronize the generated new region division information or updated region division information to the participating client.

In one embodiment, the region division information may be provided by a manager or may be generated by the video processing device. If the region division information is generated by the video processing device, a manner of generating the region division information may be as follows: The video processing device obtains the device acquisition information corresponding to the N video acquisition devices, determines, based on the device acquisition information corresponding to the N video acquisition devices, device priorities corresponding to the N video acquisition devices. The device priority represents importance of each video acquisition device. Further, a video synthesis size may be further determined based on the acquisition resolution corresponding to the N video acquisition devices. The acquisition resolution may be maximum resolution or the like of video stream data that can be acquired by a corresponding video acquisition device. Further, the video region locations corresponding to the N video acquisition devices may be determined based on the device priorities corresponding to the N video acquisition devices and the video synthesis size. The region division information is determined based on the device identifiers corresponding to the N video acquisition devices and the video region locations corresponding to the N video acquisition devices. After the region division information is generated, the region division information may be transmitted to the participating client, to facilitate synchronous rendering by the participating client.

FIG. 5 is a flowchart of another video processing method according to an embodiment of the present disclosure. As shown in FIG. 5, an example in which a participating client is used as an execution body is used for description. In other words, in the method embodiment described in FIG. 5, the video processing process includes the following steps:

S501: Obtain a video synthesis picture from a video processing device, and split the video synthesis picture into N pieces of video stream data based on region division information corresponding to video picture synthesis performed by the video processing device.

In this embodiment of the present disclosure, N is a positive integer. Each video acquisition device corresponds to one visual angle. The region division information indicates locations of the N pieces of video stream data in the video synthesis picture. The video synthesis picture is obtained by stitching the N pieces of video stream data by the video processing device based on the region division information. The N pieces of video stream data are obtained from N video acquisition devices.

The participating client obtains the video synthesis picture from the video processing device, and split the video synthesis picture into the N pieces of video stream data based on the region division information corresponding to video picture synthesis performed by the video processing device. The participating client obtains video synthesis coded data. If the video synthesis coded data is obtained by coding the video synthesis picture, the participating client may perform a decoding operation on the video synthesis coded data, to obtain the video synthesis picture. If the video synthesis coded data is obtained by coding image synthesis data and audio synthesis data, the participating client may obtain image coded data and audio coded data that form the video synthesis coded data, perform an image decoding operation on the image coded data, to obtain the image synthesis data, perform an audio decoding operation on the audio coded data, to obtain the audio synthesis data, and form the video synthesis picture by using the image synthesis data and the audio synthesis data. An image decoding manner of the image coded data corresponds to the foregoing image coding manner of the image synthesis data. An audio decoding manner of the audio coded data corresponds to the audio coding manner of the audio synthesis data.

For example, for the foregoing embodiment in S303 in FIG. 3, the participating client may obtain the video synthesis coded data from the video processing device, and obtain the image coded data and the audio coded data that form the video synthesis coded data. K pixel sets of the image coded data are obtained, k being a positive integer. In one embodiment, different pixel sets may be distinguished by set space marks. Therefore, the set space marks in the image coded data may be detected, and the k pixel sets of the image coded data are determined based on the set space marks. Further, pixel color value information corresponding to d pixels that are included in the k pixel sets may be determined based on pixel color value information of corresponding second pixels in the k pixel sets and color value difference data between a first pixel and a previous pixel of the first pixel, d being a positive integer greater than or equal to k, the second pixel being the leading pixel in a corresponding pixel set, and the first pixel being a pixel other than the second pixel in each pixel set. Specifically, a $j^{th}$ pixel set may be used as an example. Based on pixel color value information of the $1^{st}$ second pixel in the $j^{th}$ pixel set, pixel color value information of a first pixel in the $j^{th}$ pixel set may be determined based on color value difference data between the first pixel and a previous pixel of the first pixel, to obtain pixel color value information of each pixel included in the $j^{th}$ pixel set, until pixel color value information of pixels included in the k pixel sets, that is, pixel color value information corresponding to the d pixels, is obtained. Certainly, the participating client may traverse the image coded data. When the set space mark is detected, decoding starts from a new pixel set, until the pixel color value information corresponding to the d pixels is obtained. For example, in a simple example, if the set space mark is "'", and image coded data is (216, 1, 3, −1, ', 224, 0, 2, . . . ), image synthesis data (216, 217, 220, 219, 224, 224, 226, . . . ) is obtained after an avatar decoding operation is performed on the image coded data, "216, 1, 3, −1" belonging to one pixel set, and "224, 0, 2, . . . " belonging to one pixel set. This is only a simple example. Actual image coded data is obtained through an actual coding process for the image synthesis data. Further, the image synthesis data may be formed by using the pixel color value information corresponding to the d pixels. Audio decoding processing is performed on the audio coded data, to obtain the audio synthesis data. The video synthesis picture is formed by using the image synthesis data and the audio synthesis data.

Then, the participating client may divide the video synthesis picture into the N pieces of video stream data based on the region division information. As shown in FIG. 4, the video synthesis picture 403 may be divided based on the region division information. For example, the region division information includes the video region locations corresponding to the N video acquisition devices. The video synthesis picture 403 is divided based on the region division information including the video region locations corresponding to the N video acquisition devices, to obtain the video stream data 401*a*, the video stream data 401*b*, the video stream data 401*c*, the video stream data 401*d*, and the like.

S502: Perform synchronous rendering on the N pieces of video stream data based on the region division information.

In this embodiment of the present disclosure, synchronous rendering may be performed on the N pieces of video stream data based on the region division information. Specifically, a currently displayed video page may be obtained. In a video window included in the video page, video stream data corresponding to the video window is output. Each video window corresponds to one visual angle. The video stream data corresponding to the video window is video stream data acquired by a video acquisition device at a visual angle corresponding to the video window. In one embodiment, an example in which the video page is a livestreaming page, the video window is a livestreaming window, and the visual angle is a livestreaming visual angle is used. The participating client may obtain a currently displayed livestreaming page, and obtain M livestreaming windows included in the livestreaming page and livestreaming visual angles corresponding to the M livestreaming windows, M being a positive integer. The livestreaming visual angle corresponds to a visual angle of a video acquisition device. For example, the livestreaming visual angle is a region A, and corresponds to a visual angle of a video acquisition device deployed in the region A. Further, video display region information may be determined based on video acquisition devices corresponding to the M livestreaming visual angles, the video display region information indicating the video acquisition devices corresponding to the M livestreaming windows. In other words, the video display region information may include the video acquisition devices associated with the M livestreaming windows. The video display region information may be device identifiers associated with the M livestreaming windows. In this case, a manner in which synchronous rendering is performed on the N pieces of video stream data based on the region division information in S502 may be that video stream data corresponding to each livestreaming window may be determined from the N pieces of video stream data based on the video display region information, and video stream data corresponding to each livestreaming window may be rendered in the corresponding livestreaming window based on the video stream data corresponding to the livestreaming window. For example, a livestreaming window 1 is associated with a device identifier 1. In this case, video stream data corresponding to the livestreaming window 1 is video stream data of a video acquisition device corresponding to the device identifier 1. The video stream data corresponding to each livestreaming window is rendered in the livestreaming window based on the video stream data corresponding to the livestreaming window. The device identifier may be a unique identifier of the corresponding video acquisition device, and obtained, for example, by numbering each video acquisition device. The device identifier may alternatively be a factory number of each video acquisition device or the like. This is not limited herein. The device identifier may be data in a form of a character string, a visual angle, or the like. For example, the device identifier of the video acquisition device 1 may be a character string like A11, a factory number of the video acquisition device 1, or a visual angle (such as a main stage or a backstage). This is not limited herein.

Figure 6:
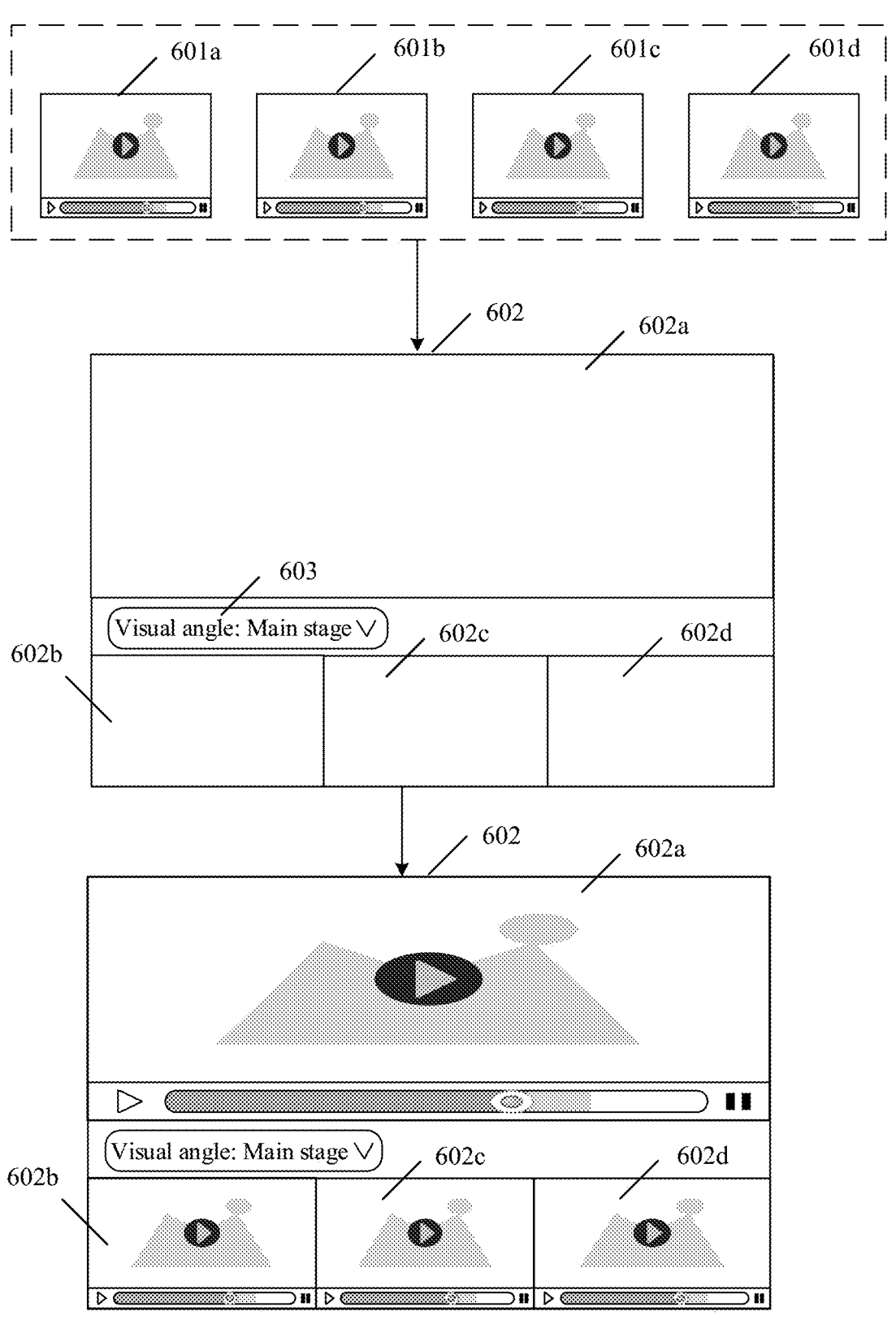
FIG. 6 is a schematic diagram of a video display scenario according to an embodiment of the present disclosure.

For example, FIG. 6 is a schematic diagram of a video display scenario according to an embodiment of the present disclosure. As shown in FIG. 6, if N is 4, the participating client obtains video stream data 601a corresponding to the video acquisition device 1, video stream data 601b corresponding to a video acquisition device 2, video stream data 601c corresponding to a video acquisition device 3, video stream data 601d corresponding to a video acquisition device 4, and the like. The participating client may obtain, based on a livestreaming page 602, video display region information corresponding to the participating client. The video display region information may include the video acquisition devices associated with the M livestreaming windows. If M is 4 herein, the video display region information may include (a livestreaming window 602a, the video acquisition device 1), (a livestreaming window 602b, the video acquisition device 1), (a livestreaming window 602c, the video acquisition device 3), and (a livestreaming window 602d, the video acquisition device 2). Based on the video display region information, it is determined that the livestreaming window 602a corresponds to the video stream data 601a, the livestreaming window 602b corresponds to the video stream data 601a, the livestreaming window 602c corresponds to the video stream data 601c, and the livestreaming window 602d corresponds to the video stream data 601b. Further, based on the video stream data corresponding to each livestreaming window, the video stream data 601a is rendered in the livestreaming window 602a, the video stream data 601b is rendered in the livestreaming window 602a, the video stream data 601c is rendered in the livestreaming window 602c, and the video stream data 601d is rendered in the livestreaming window 602d.

In other words, when the participating client finally renders each video data stream in the livestreaming page, not all obtained video stream data needs to be rendered. Video stream data rendered in different livestreaming windows may be the same. In one embodiment, a target renderer may be used to synchronously render the video stream data corresponding to each livestreaming window in the corresponding livestreaming window. The target renderer supports rendering in multiple livestreaming windows, in other words, the target renderer supports inputs in the multiple livestreaming windows and may specify the livestreaming visual angle corresponding to each livestreaming window (that is, the video display region information), to improve display synchronization of multiple videos.

In one embodiment, the M livestreaming windows may include a primary window and a secondary window. The secondary window is a livestreaming window other than the primary window in the M livestreaming windows, and the primary window is a main livestreaming window for display. In this case, displaying of video stream data in the primary window may be switched to displaying of video stream data in a first livestreaming window, in response to a primary picture switching request for the first livestreaming window in the secondary window, content displayed in the primary window after the switching being the same as content displayed in the first livestreaming window. As shown in FIG. 6, the livestreaming window 602a may be considered as the primary window. Other livestreaming windows may be considered as secondary windows. If the first livestreaming window is the livestreaming window 602c, the participating client may switch displaying of the video stream data 601a in the livestreaming window 602a to displaying of the video stream data 601c, in response to a primary picture switching request for the livestreaming window 602c. At this time, content displayed in the livestreaming window 602a is the same as content displayed in the livestreaming window 602c. The primary picture switching request for the first livestreaming window in the secondary window may be triggered by a switching trigger operation on the first livestreaming window, or may be triggered by a trigger operation on a visual angle switching component. This is not limited herein. For example, in FIG. 6, candidate livestreaming visual angles are displayed in response to a trigger operation on a visual angle switching component 603. Video stream data corresponding to a target livestreaming visual angle is obtained in response to a selection operation on the target livestreaming visual angle in the candidate livestreaming visual angles. Displaying of the video stream data in the primary window may be switched to displaying of the video stream data in the target livestreaming visual angle.

In one embodiment, the participating client may perform volume reduction adjustment (such as muting or volume reduction) on audio data of the video stream data displayed in the secondary window, to enable a user to better receive information about the video stream data in each livestreaming window, to improve a display effect of the video stream data.

In one embodiment, the participating client may obtain a first video acquisition device corresponding to a second livestreaming window in the N video acquisition devices, in response to a playing request for the second livestreaming window, the second livestreaming window not belonging to the M livestreaming windows. Video stream data corresponding to the first video acquisition device is obtained from the N pieces of video stream data, and the video stream data corresponding to the first video acquisition device is output in the second livestreaming window. When there are the primary window and the secondary window, the second livestreaming window may be added in a form of the secondary window, or the second livestreaming window may be directly switched to the primary window and an original primary window is switched to the secondary window. This is not limited herein.

Figure 7:
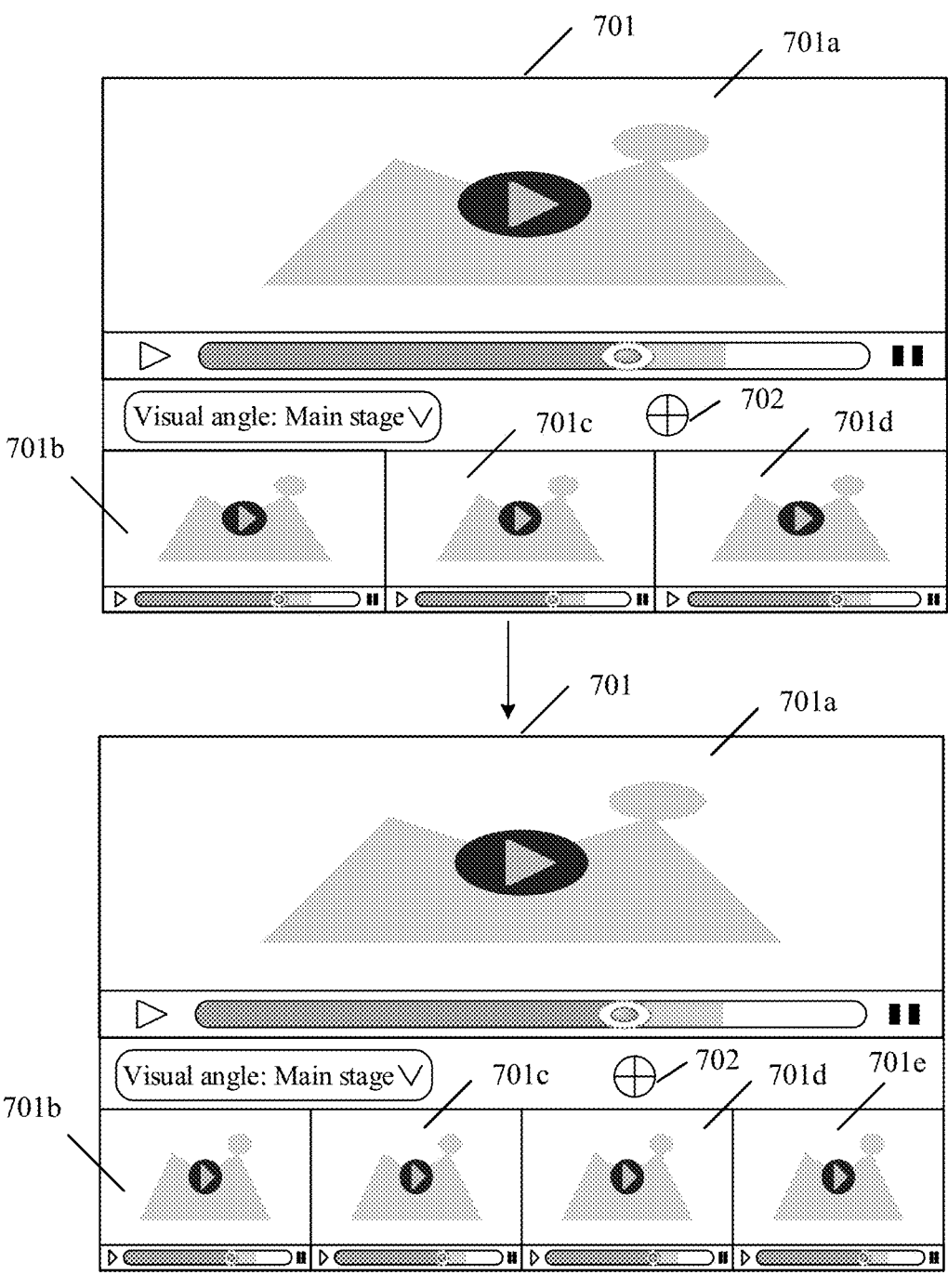
FIG. 7 is a schematic diagram of a visual angle adding scenario according to an embodiment of the present disclosure.

For example, FIG. 7 is a schematic diagram of a visual angle adding scenario according to an embodiment of the present disclosure. As shown in FIG. 7, the livestreaming page 701 includes a livestreaming window 701a, a livestreaming window 701b, a livestreaming window 701c, and a livestreaming window 701d. A to-be-selected window may be displayed in response to a trigger operation on a window adding component 702 (only an example component form in FIG. 7). The to-be-selected window is a livestreaming window not displayed currently in the livestreaming page 701. The first video acquisition device corresponding to the second livestreaming window is obtained in response to an adding operation on the second livestreaming window in the to-be-selected window. A second livestreaming window 701e is added to the livestreaming page 701. The video stream data corresponding to the first video acquisition device is output in the second livestreaming window 701e.

According to the present disclosure, when a user clicks to switch the livestreaming visual angle, instant switching can be implemented and time synchronization between video stream data that is switched to be displayed and other displayed video stream data can be implemented.

The participating client is triggered to perform S501 to obtain the video synthesis picture from the video processing device, in response to a display operation for the livestreaming page. In a process of displaying the livestreaming page, the participating client is continuously triggered to perform S501, to implement livestreaming. In other words, in a livestreaming process, S501 is continuously triggered to obtain the video stream data, provided that a stream interruption (where for example, the livestreaming ends, or video stream data sent by the video processing device is not received) does not exist, or the user does not actively stop playing. In one embodiment, there is one participating client or at least two participating clients. Each participating client may perform the steps shown in FIG. 5 and output the video stream data for the user.

Figure 8:
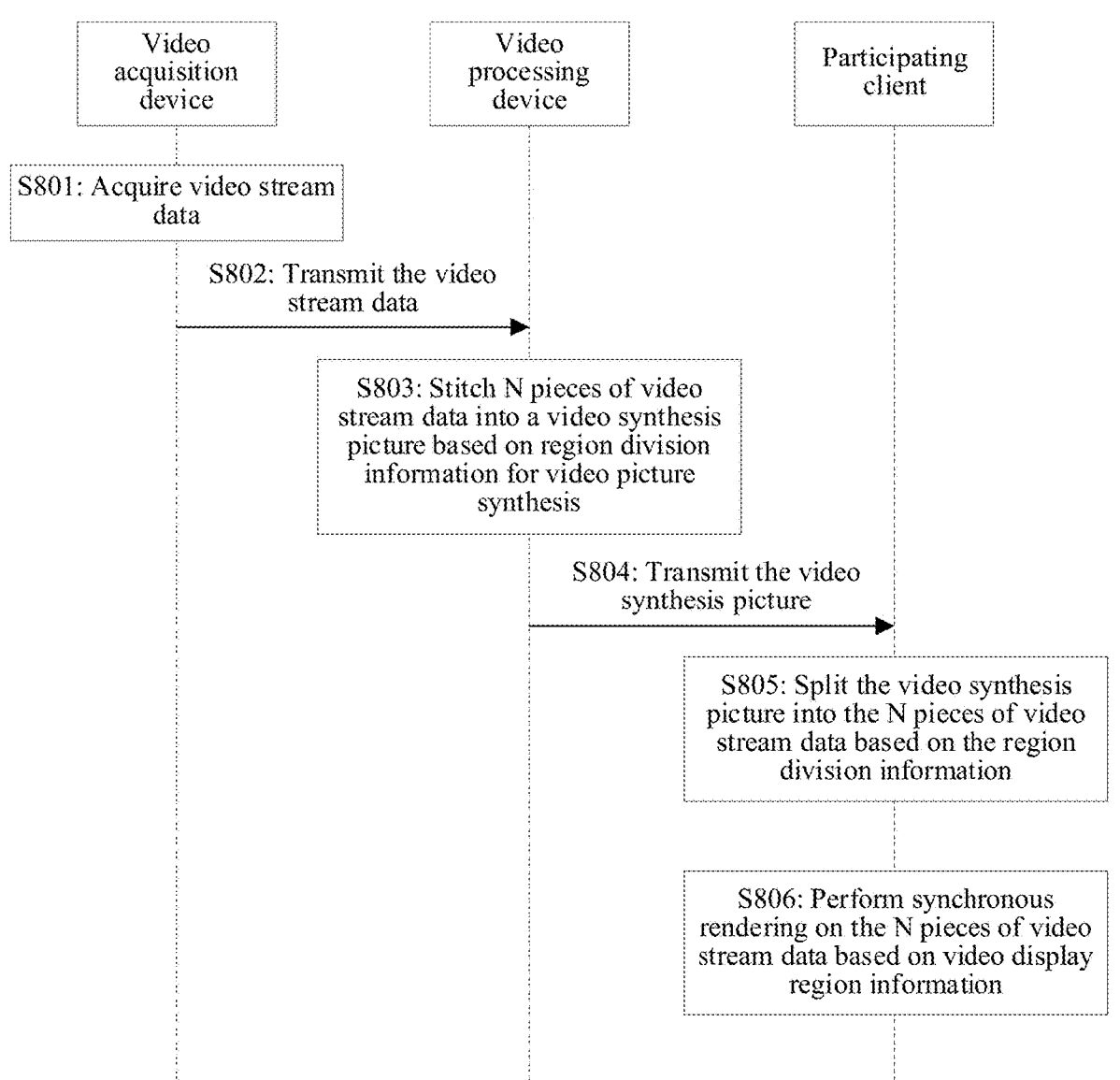
FIG. 8 is an interaction flowchart of video processing according to an embodiment of the present disclosure.

FIG. 8 is an interaction flowchart of video processing according to an embodiment of the present disclosure. As shown in FIG. 8, the video processing process may include the following steps:

S801: Acquire video stream data.

In this embodiment of the present disclosure, a video acquisition device may acquire the video stream data. The video acquisition device may use corresponding acquisition resolution to acquire the video stream data. The acquisition resolution may be high resolution, to satisfy a subsequent definition requirement during switching between different visual angles, and to enable a user to display the video stream data with different definition more conveniently. The video acquisition device may obtain maximum resolution of the video acquisition device and determine the maximum resolution as the corresponding acquisition resolution. Alternatively, the maximum resolution and acquisition costs of the video acquisition device may be obtained. The acquisition costs may include time, a resource, and the like required by the video acquisition device to acquire video stream data in a case of different resolution. The corresponding acquisition resolution may be determined based on the maximum resolution and the acquisition costs, so that the acquisition resolution may be as high as possible in a case of low acquisition costs. In one embodiment, the acquisition resolution may be greater than or equal to default resolution corresponding to the livestreaming page. A quantity of video acquisition devices may be N, N being a positive integer. Each video acquisition device corresponds to one visual angle.

S802: Transmit the video stream data.

In this embodiment of the present disclosure, the video acquisition device may push the video stream data to a video processing device. In one embodiment, the video acquisition device may obtain a target media streaming manner transmitted by the video processing device, and transmit the video stream data in the target media streaming manner to the video processing device. For details, refer to related descriptions in S301 in FIG. 3. In one embodiment, the target media streaming manner may alternatively be negotiated by each video acquisition device, or may be provided by a manager. This is not limited herein.

S803: Stitch N pieces of video stream data into a video synthesis picture based on region division information used for performing video picture synthesis.

In this embodiment of the present disclosure, the video processing device may stitch the N pieces of video stream data into the video synthesis picture based on the region division information used for performing the video picture synthesis. For details, refer to related descriptions in S302 in FIG. 3.

S804: Transmit the video synthesis picture.

In this embodiment of the present disclosure, the video processing device transmits the video synthesis picture to a participating client. For details, refer to related descriptions in S303 in FIG. 3.

S805: Split the video synthesis picture into the N pieces of video stream data based on the region division information.

In this embodiment of the present disclosure, the participating client may split the video synthesis picture into the N pieces of video stream data based on the region division information. For details, refer to related descriptions in S501 in FIG. 5.

S806: Perform synchronous rendering on the N pieces of video stream data based on video display region information.

In this embodiment of the present disclosure, the participating client may perform synchronous rendering on the N pieces of video stream data based on the video display region information. For details, refer to related descriptions in S502 in FIG. 5.

In the embodiments of the present disclosure, the video stream data is obtained from the N video acquisition devices, N being a positive integer, and each video acquisition device corresponding to one visual angle. Then, the N pieces of video stream data are stitched into the video synthesis picture based on the region division information used for performing video picture synthesis, the region division information indicating the locations of the N pieces of video stream data in the video synthesis picture. In this manner, video stream data at multiple visual angles (that is, the video acquisition devices) can be synchronously obtained, and the video stream data obtained at each visual angle is synthesized to obtain the video synthesis picture. This is equivalent to describing that multiple channels of bit streams are synthesized into a channel of bit stream, so that it may be considered that the video stream data at each visual angle in the video synthesis picture is obtained at the same moment. The video synthesis picture is sent to the participating client, and the participating client can obtain the video stream data at each visual angle by obtaining the video synthesis picture. In this way, the participating client can split the video synthesis picture into the N pieces of video stream data based on the region division information, and perform synchronous rendering on the N pieces of video stream data based on the video display region information corresponding to the participating client. Therefore, videos at the multiple visual angles are synchronously played, and display fluency of the multiple videos and time synchronization between the multiple videos are improved.

Figure 9:
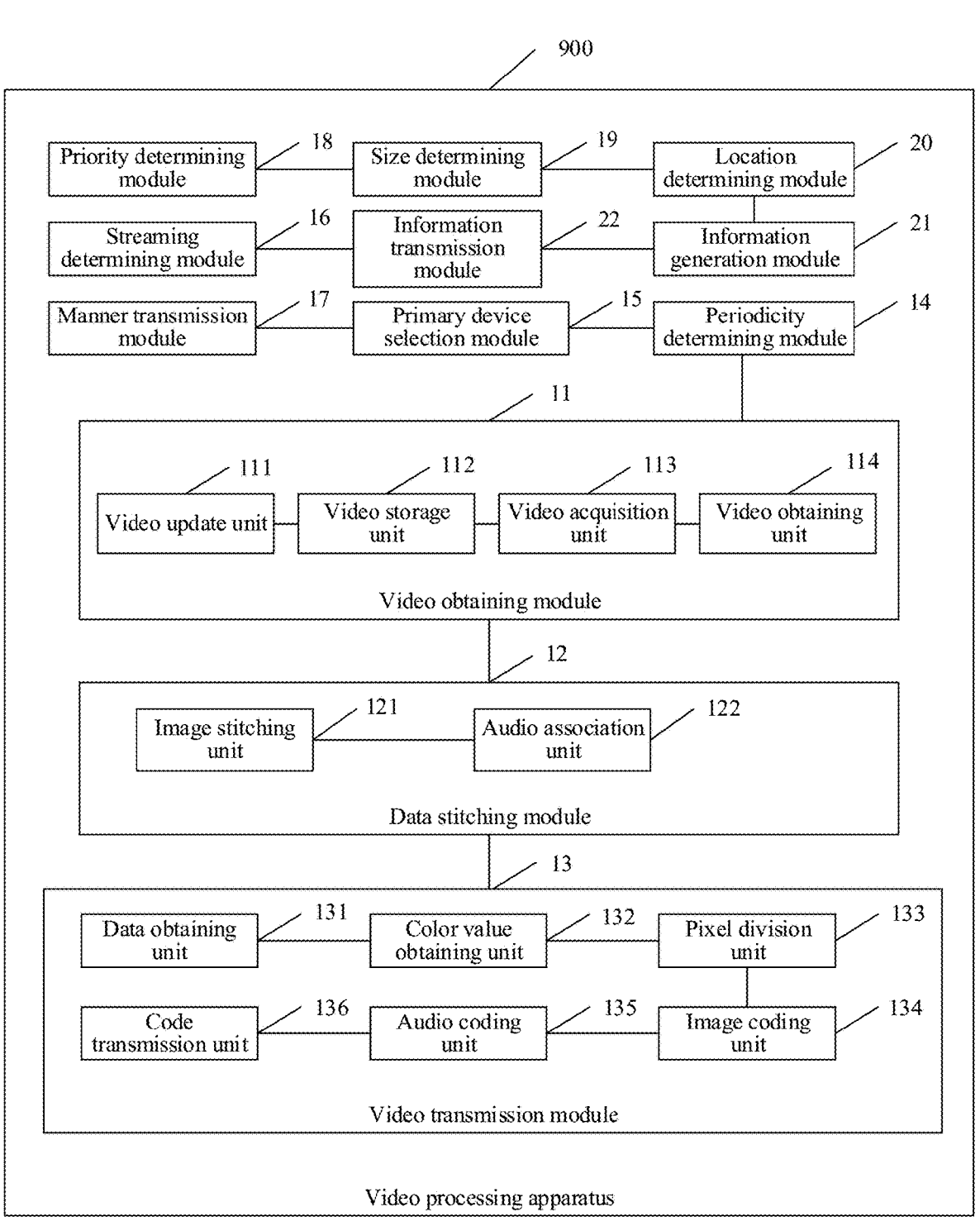
FIG. 9 is a schematic diagram of a video processing apparatus according to an embodiment of the present disclosure.

FIG. 9 is a schematic diagram of a video processing apparatus according to an embodiment of the present disclosure. The video processing apparatus may be a computer program running in a computer device. For example, the video processing apparatus may be application software. The apparatus may be configured to perform corresponding steps in the method according to the embodiments of the present disclosure. As shown in FIG. 9, the video processing apparatus 900 may include: a video obtaining module 11, a data stitching module 12, and a video transmission module 13.

The video obtaining module 11 is configured to obtain video stream data from N video acquisition devices, N being a positive integer, and each video acquisition device corresponding to one visual angle.

The data stitching module 12 is configured to stitch N pieces of video stream data into a video synthesis picture based on region division information used for performing video picture synthesis, the region division information indicating locations of the N pieces of video stream data in the video synthesis picture.

The video transmission module 13 is configured to transmit the video synthesis picture to a participating client, to enable the participating client to split the video synthesis picture into the N pieces of video stream data based on the region division information, and perform synchronous rendering on the N pieces of video stream data based on video display region information corresponding to the participating client.

The apparatus 900 further includes:

a periodicity determining module 14, configured to obtain a video playing frame rate, and determine a video frame switching periodicity based on the video playing frame rate.

The video obtaining module 11 includes:

a video update unit 111, configured to: delete historical video stream data associated with the N video acquisition devices, and perform associative storage on the N pieces of video stream data and the N video acquisition devices within the video frame switching periodicity, in response to receiving the video stream data sent by the N video acquisition devices; and a video storage unit 112, configured to obtain, in a case that a video frame switching condition indicated by the video frame switching periodicity is satisfied, video stream data that is associated with the N video acquisition devices in the case that the video frame switching condition is satisfied.

The apparatus 900 further includes:

a primary device selection module 15, configured to: obtain device acquisition information and coverage regions corresponding to the N video acquisition devices, and determine a primary device in the N video acquisition devices based on the device acquisition information and the coverage regions corresponding to the N video acquisition devices.

The video obtaining module 11 includes:

a video acquisition unit 113, configured to obtain video stream data from a video acquisition device other than the primary device in the N video acquisition devices, in response to receiving video stream data transmitted by the primary device.

The apparatus 900 further includes:

a streaming determining module 16, configured to: establish data connections to the N video acquisition devices, and determine, based on data transmission losses corresponding to the data connections and media streaming manners, a target media streaming manner from the media streaming manners; and a manner transmission module 17, configured to transmit the target media streaming manner to the N video acquisition devices.

The video obtaining module 11 includes:

a video obtaining unit 114, configured to obtain video stream data that is transmitted by the N video acquisition devices based on the target media streaming manner.

The region division information includes video region locations corresponding to the N video acquisition devices.

The data stitching module 12 includes:

an image stitching module 121, configured to: obtain image data and audio data that are included in each piece of video stream data, and stitch the image data included in the N pieces of video stream data into a synthetic image based on the video region locations corresponding to the N video acquisition devices; and an audio association unit 122, configured to associate the audio data corresponding to the N pieces of image data with the N pieces of image data in the synthetic image, to obtain the video synthesis picture, one piece of video stream data being obtained after each piece of audio data is associated with the corresponding piece of image data.

The video transmission module 13 includes:

a data obtaining unit 131, configured to obtain image synthesis data and audio synthesis data that form the video synthesis picture; and a color value obtaining unit 132, configured to: obtain d pixels and pixel color value information corresponding to each pixel that are included in the image synthesis data, and obtain color value difference data between pixel color value information corresponding to every two adjacent pixels, the every two adjacent pixels being every two adjacent pixels in the d pixels, and d being a positive integer;

a pixel division unit 133, configured to divide the d pixels into k pixel sets based on the color value difference data between the pixel color value information corresponding to every two adjacent pixels, k being a positive integer less than or equal to d, and pixels included in each pixel set being consecutive in the image synthesis data;

an image coding unit 134, configured to form, by using pixel color value information of a second pixel in each pixel set and color value difference data between a first pixel and a previous pixel of the first pixel, image coded data corresponding to the image synthesis data, the second pixel being the leading pixel in a corresponding pixel set, and the first pixel being a pixel other than the second pixel in each pixel set;

an audio coding unit 135, configured to perform audio coding processing on the audio synthesis data, to obtain audio coded data; and a code transmission unit 136, configured to transmit video synthesis coded data formed by the image coded data and the audio coded data to the participating client, to enable the participating client to perform a decoding operation on the video synthesis coded data, to obtain the video synthesis picture.

The apparatus 900 further includes:

a priority determining module 18, configured to: obtain device acquisition information corresponding to the N video acquisition devices, and determine, based on the device acquisition information corresponding to the N video acquisition devices, device priorities corresponding to the N video acquisition devices;

a size determining module 19, configured to determine a video synthesis size based on acquisition resolution corresponding to the N video acquisition devices;

a location determining module 20, configured to determine, based on the device priorities corresponding to the N video acquisition devices and the video synthesis size, video region locations corresponding to the N video acquisition devices;

an information generation module 21, configured to determine the region division information based on device identifiers corresponding to the N video acquisition devices and the video region locations corresponding to the N video acquisition devices; and an information transmission module 22, configured to transmit the region division information to the participating client.

This embodiment of the present disclosure provides the video processing apparatus. The apparatus may run in the video processing device and obtain the video stream data from the N video acquisition devices, N being a positive integer, and each video acquisition device corresponding to one visual angle. Then, the N pieces of video stream data are stitched into the video synthesis picture based on the region division information used for performing video picture synthesis, the region division information indicating the locations of the N pieces of video stream data in the video synthesis picture. In this manner, video stream data at multiple visual angles (that is, the video acquisition devices) can be synchronously obtained, and the video stream data obtained at each visual angle is synthesized to obtain the video synthesis picture. This is equivalent to describing that multiple channels of bit streams are synthesized into a channel of bit stream, so that it may be considered that the video stream data at each visual angle in the video synthesis picture is obtained at the same moment. The video synthesis picture is sent to the participating client, and the participating client can obtain the video stream data at each visual angle by obtaining the video synthesis picture. In this way, the participating client can split the video synthesis picture into the N pieces of video stream data based on the region division information, and perform synchronous rendering on the N pieces of video stream data based on the video display region information corresponding to the participating client. Therefore, videos at the multiple visual angles are synchronously played, and display fluency of the multiple videos and time synchronization between the multiple videos are improved.

Figure 10:
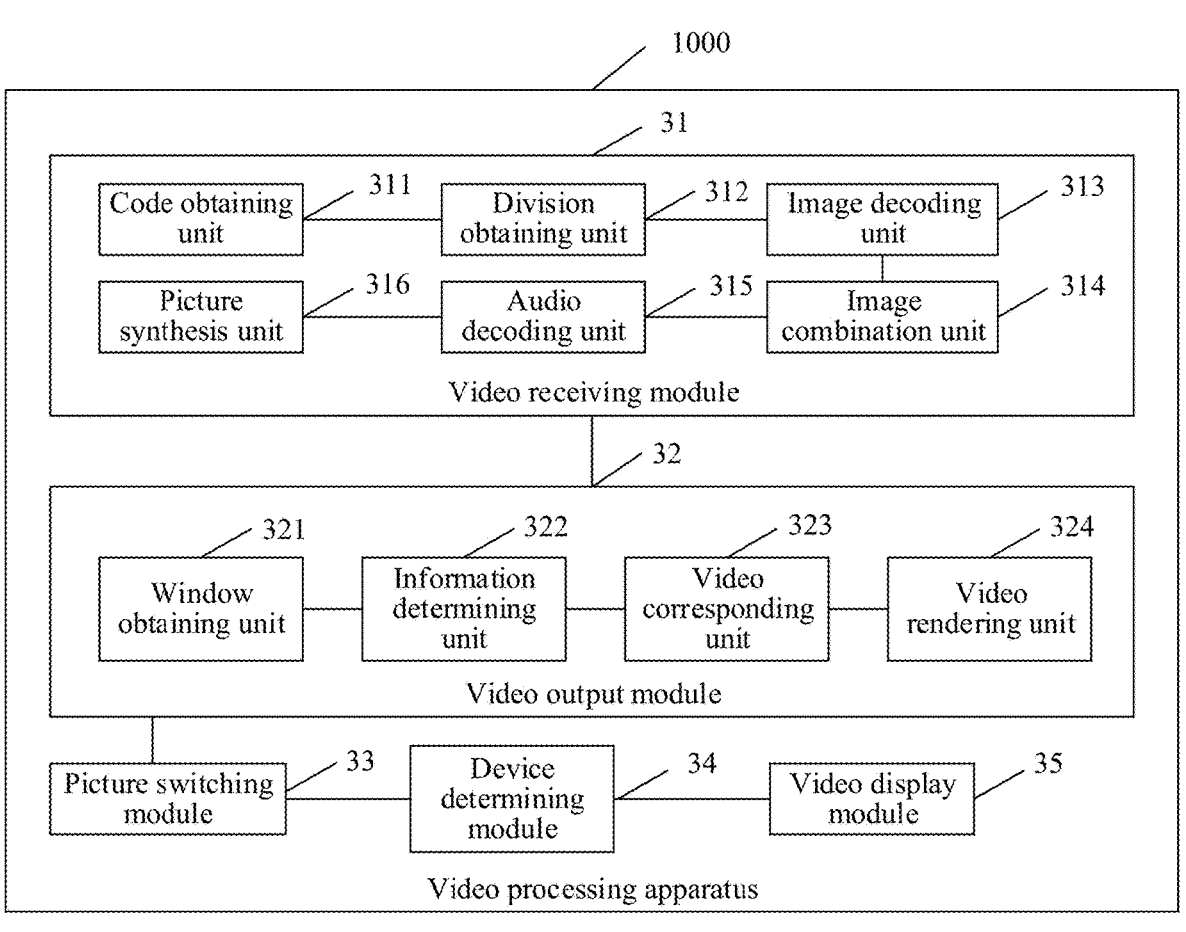
FIG. 10 is a schematic diagram of another video processing apparatus according to an embodiment of the present disclosure.

FIG. 10 is a schematic diagram of another video processing apparatus according to an embodiment of the present disclosure. The video processing apparatus may be a computer program running on a computer device. For example, the video processing apparatus may be application software. The apparatus may be configured to perform corresponding steps in the method according to the embodiments of the present disclosure. As shown in FIG. 10, the video processing apparatus 1000 may include: a video receiving module 31 and a video output module 32.

The video receiving module 31 is configured to: obtain a video synthesis picture from a video processing device, and split the video synthesis picture into N pieces of video stream data based on region division information corresponding to video picture synthesis performed by the video processing device, N being a positive integer, the region division information indicating locations of the N pieces of video stream data in the video synthesis picture, the video synthesis picture being obtained by stitching the N pieces of video stream data by the video processing device based on the region division information, the N pieces of video stream data being obtained from N video acquisition devices, and each video acquisition device corresponding to one visual angle.

The video output module 32 is configured to perform synchronous rendering on the N pieces of video stream data based on video display region information.

The video output module 32 includes:

a window obtaining unit 321, configured to: obtain a currently displayed livestreaming page, and obtain M livestreaming windows included in the livestreaming page and livestreaming visual angles corresponding to the M livestreaming windows, M being a positive integer;

an information determining unit 322, configured to determine the video display region information based on video acquisition devices corresponding to the M livestreaming visual angles, the video display region information indicating the video acquisition devices corresponding to the M livestreaming windows;

a video corresponding unit 323, configured to determine video stream data corresponding to each livestreaming window from the N pieces of video stream data based on the video display region information; and a video rendering unit 324, configured to render the video stream data corresponding to the livestreaming window in the corresponding livestreaming window based on the video stream data corresponding to each livestreaming window.

The M livestreaming windows include a primary window and a secondary window. The secondary window is a livestreaming window other than the primary window in the M livestreaming windows.

The apparatus 1000 further includes:

a picture switching module 33, configured to switch from displaying of video stream data in the primary window to displaying of video stream data in a first livestreaming window, in response to a primary picture switching request for the first livestreaming window in the secondary window, content displayed in the primary window after the switching being the same as content displayed in the first livestreaming window.

The apparatus 1000 further includes:

a device determining module 34, configured to obtain a first video acquisition device corresponding to a second livestreaming window in the N video acquisition devices, in response to a playing request for the second livestreaming window, the second livestreaming window not belonging to the M livestreaming windows; and a video display module 35, configured to: obtain video stream data corresponding to the first video acquisition device from the N pieces of video stream data, and output the video stream data corresponding to the first video acquisition device in the second livestreaming window.

The video receiving module 31 includes:

a code obtaining unit 311, configured to: obtain video synthesis coded data from the video processing device and obtain image coded data and audio coded data that form the video synthesis coded data;

a division obtaining unit 312, configured to obtain K pixel sets of the image coded data, k being a positive integer;

an image decoding unit 313, configured to: determine, based on pixel color value information of corresponding second pixels in the k pixel sets and color value difference data between a first pixel and a previous pixel of the first pixel, pixel color value information corresponding to d pixels that are included in the k pixel sets, d being a positive integer greater than or equal to k, the second pixel being the leading pixel in a corresponding pixel set, and the first pixel being a pixel other than the second pixel in each pixel set;

an image combination unit 314, configured to form image synthesis data by using the pixel color value information corresponding to the d pixels;

an audio decoding unit 315, configured to perform audio decoding processing on the audio coded data, to obtain audio synthesis data; and a picture synthesis unit 316, configured to form the video synthesis picture by using the image synthesis data and the audio synthesis data.

In this embodiment of the present disclosure, the apparatus may run in a participating client. The participating client may split the video synthesis picture into the N pieces of video stream data based on the region division information provided by the video processing device, to obtain synchronous video stream data at each visual angle, and render the video stream data, to synchronously play multiple videos, and improve display fluency of the multiple videos and time synchronization between the multiple videos.

Figure 11:
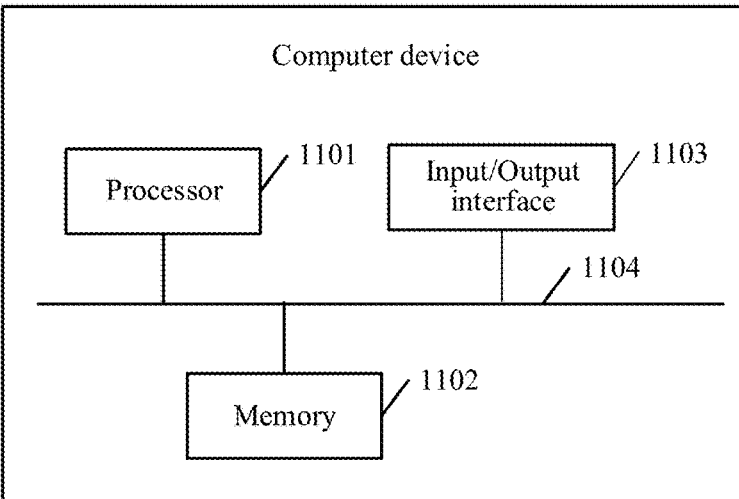
FIG. 11 is a schematic structural diagram of a computer device according to an embodiment of the present disclosure.

FIG. 11 is a schematic structural diagram of a computer device according to an embodiment of the present disclosure. As shown in FIG. 11, the computer device in this embodiment of the present disclosure may include: one or more processors 1101, a memory 1102, and an input/output interface 1103. The processor 1101, the memory 1102, the input/output interface 1103 are connected through a bus 1104. The memory 1102 is configured to store a computer program. The computer program includes program instructions. The input/output interface 1103 is configured to receive data and output data, for example, configured to perform data exchange between a video acquisition device and a video processing device, or perform data exchange between a video processing device and a participating client. The processor 1101 is configured to execute the program instructions stored in the memory 1102.

In an embodiment, the processor 1101 is located in the video processing device and may perform the following operations:

obtaining video stream data from N video acquisition devices, N being a positive integer, and each video acquisition device corresponding to one visual angle;

stitching N pieces of video stream data into a video synthesis picture based on region division information used for performing video picture synthesis, the region division information indicating locations of the N pieces of video stream data in the video synthesis picture; and transmitting the video synthesis picture to a participating client, to enable the participating client to split the video synthesis picture into the N pieces of video stream data based on the region division information, and perform synchronous rendering on the N pieces of video stream data based on video display region information corresponding to the participating client.

In another embodiment, the processor 1101 is located in the participating client and may perform the following operations:

obtaining a video synthesis picture from a video processing device, and splitting the video synthesis picture into N pieces of video stream data based on region division information corresponding to video picture synthesis performed by the video processing device, N being a positive integer, the region division information indicating locations of the N pieces of video stream data in the video synthesis picture, the video synthesis picture being obtained by stitching the N pieces of video stream data by the video processing device based on the region division information, the N pieces of video stream data being obtained from N video acquisition devices, and each video acquisition device corresponding to one visual angle; and performing synchronous rendering on the N pieces of video stream data based on video display region information.

In some feasible implementations, the processor 1101 may be a central processing unit (CPU). The processor may alternatively be another general-purpose processor, a digital signal processor (DSP), an application-specific integrated circuit (ASIC), a field programmable gate array (FPGA), or another programmable logic device, a discrete gate or a transistor logic device, a discrete hardware component, or the like. The general-purpose processor may be a microprocessor, or the processor may be any suitable processor or the like.

The memory 1102 may include a read-only memory and a random access memory, and provide instructions and data to the processor 1101 and the input/output interface 1103. A part of the memory 1102 may further include a non-volatile random access memory. For example, the memory 1102 may further store device type information.

During specific implementation, the computer device may perform the implementations provided in the steps in FIG. 3 or FIG. 5 through built-in functional modules of the computer device. For details, refer to the implementations provided in the steps in FIG. 3 or FIG. 5, and details are not described herein again.

This embodiment of the present disclosure provides the computer device, including: the processor, the input/output interface, and the memory. The computer program in the memory is obtained by the processor, to perform the steps in the method shown in FIG. 3 or FIG. 5, and perform video processing operations. According to this embodiment of the present disclosure, the video stream data is obtained from the N video acquisition devices, N being a positive integer; the N pieces of video stream data are stitched into the video synthesis picture based on the region division information used for performing video picture synthesis, the region division information indicating the locations of the N pieces of video stream data in the video synthesis picture; and the video synthesis picture is transmitted to the participating client, to enable the participating client to split the video synthesis picture into the N pieces of video stream data based on the region division information, and perform synchronous rendering on the N pieces of video stream data based on the video display region information corresponding to the participating client. Through the foregoing process, video stream data at multiple visual angles (that is, the video acquisition devices) can be synchronously obtained, and the video stream data obtained at each visual angle is synthesized to obtain the video synthesis picture. This is equivalent to describing that multiple channels of bit streams are synthesized into a channel of bit stream, so that it may be considered that the video stream data at each visual angle in the video synthesis picture is obtained at the same moment. The client can obtain the video stream data at each visual angle by obtaining the video synthesis picture, to synchronously play videos at the multiple visual angles, and improve display fluency of the multiple videos and time synchronization between the multiple videos.

An embodiment of the present disclosure further provides a computer-readable storage medium. The computer-readable storage medium stores a computer program. The computer program is applied to be loaded by the processor and implements the video processing method provided in the steps in FIG. 3 or FIG. 5. For details, refer to the implementations provided in the steps in FIG. 3 or FIG. 5, and details are not described herein again. In addition, descriptions of beneficial effects of the same method are not provided herein again. For technical details that are not disclosed in the embodiment of the computer-readable storage medium of the present disclosure, refer to the descriptions of the method embodiments of the present disclosure. In an example, the computer program may be deployed to be executed on a computer device, or deployed to be executed on multiple computer devices at the same location, or deployed to be executed on multiple computer devices that are distributed at multiple locations and interconnected through a communication network.

The computer-readable storage medium may be an internal storage unit of the computer device, for example, a hard disk or an internal memory of the computer device. The computer-readable storage medium may alternatively be an external storage device of the computer device, for example, a removable hard disk, a smart media card (SMC), a secure digital (SD) card, or a flash card equipped on the computer device. Further, the computer-readable storage medium may include both an internal storage unit and an external storage device of the computer device. The computer-readable storage medium is configured to store the computer program and another program and data that are required by the computer device. The computer-readable storage medium may further be configured to temporarily store data that has been output or data to be output.

An embodiment of the present disclosure further provides a computer program product, including a computer program. The computer program is stored in a computer-readable storage medium. A processor of a computer device reads the computer program from the computer-readable storage medium, and the processor executes the computer program, to enable the computer device to perform the method provided in embodiments in FIG. 3 or FIG. 5. In this way, video stream data at multiple visual angles (that is, video acquisition devices) can be synchronously obtained, and the video stream data obtained at each visual angle is synthesized to obtain a video synthesis picture. This is equivalent to describing that multiple channels of bit streams are synthesized into a channel of bit stream, so that it may be considered that the video stream data at each visual angle in the video synthesis picture is obtained at the same moment. A client can obtain the video stream data at each visual angle by obtaining the video synthesis picture, to synchronously play videos at the multiple visual angles, and improve display fluency of the multiple videos and time synchronization between the multiple videos.

In the specification, the claims, and the accompanying drawings of the embodiments of the present disclosure, the terms "first", "second" or the like are intended to distinguish between different objects but do not indicate a particular order. In addition, the term "include" and any variant thereof are intended to cover a non-exclusive inclusion. For example, a process, a method, an apparatus, a product, or a device that includes a series of steps or units is not limited to the listed steps or modules, but in some embodiments, further includes a step or a module that is not listed, or in some embodiments, further includes another step or unit that is intrinsic to the process, the method, the apparatus, the product, or the device.

The term module (and other similar terms such as submodule, unit, subunit, etc.) in this disclosure may refer to a software module, a hardware module, or a combination thereof. A software module (e.g., computer program) may be developed using a computer programming language. A hardware module may be implemented using processing circuitry and/or memory. Each module can be implemented using one or more processors (or processors and memory). Likewise, a processor (or processors and memory) can be used to implement one or more modules. Moreover, each module can be part of an overall module that includes the functionalities of the module.

A person of ordinary skill in the art may be aware that units and algorithm steps in the examples described with reference to the embodiments disclosed in this specification can be implemented by electronic hardware, computer software, or a combination thereof. To clearly describe interchangeability between hardware and software, combinations and steps of each example have been generally described based on functions. Whether the functions are performed by hardware or software depends on particular applications and design constraint conditions of the technical solutions. A person skilled in the art may use different methods to implement the described functions for each particular application, but it is not considered that the implementation goes beyond the scope of the present disclosure.

The methods and related apparatuses provided in the embodiments of the present disclosure are described with reference to the method flowcharts and/or the schematic structural diagrams provided in the embodiments of the present disclosure. Specifically, each process and/or each block in the method flowcharts and/or the schematic structural diagrams and combination of the processes and/or the blocks in the flowcharts and/or block diagrams may be implemented by computer program instructions. These computer program instructions may be provided to a general-purpose computer, a dedicated computer, an embedded processor, or a processor of another programmable video processing device to generate a machine, so that the instructions executed by the computer or the processor of the another programmable video processing device generate an apparatus for implementing a specific function in one or more processes in the flowcharts and/or one or more blocks in the schematic structural diagrams. These computer program instructions may be stored in a computer-readable memory that can guide a computer or another programmable video processing device to work in a specified manner, so that the instructions stored in the computer-readable memory generate an artifact including an instruction apparatus. The instruction apparatus implements a specific function in one or more processes in the flowcharts and/or one or more blocks in the schematic structural diagrams. The computer program instructions may be loaded onto a computer or another programmable video processing device, so that a series of operations and steps are performed on the computer or the another programmable device, to generate computer-implemented processing. Therefore, the instructions executed on the computer or the another programmable device provide steps for implementing a specific function in one or more processes in the flowcharts and/or one or more blocks in the schematic structural diagrams.

What is disclosed above is merely exemplary embodiments of the present disclosure, and certainly is not intended to limit the scope of the claims of the present disclosure. Therefore, equivalent variations made in accordance with the claims of the present disclosure fall within the scope of the present disclosure.

What is claimed is:

1. A video processing method, performed by a video processing device, and comprising:

obtaining video stream data from N video acquisition devices, N being a positive integer, and each video acquisition device corresponding to one visual angle;

stitching N pieces of video stream data into a video synthesis picture based on region division information for video picture synthesis, the region division information indicating locations of the N pieces of video stream data in the video synthesis picture, the region division information including N association relationships each associating a device identifier of a respective one of the N video acquisition devices with a corresponding coordinate-based video region location in the video synthesis picture; and transmitting the video synthesis picture and the region division information to a participating client, to enable the participating client to split the video synthesis picture into the N pieces of video stream data based on the region division information, and perform synchronous rendering on the N pieces of video stream data based on video display region information corresponding to the participating client.

2. The method according to claim 1, further comprising:

obtaining a video playing frame rate, and determining a video frame switching periodicity based on the video playing frame rate; and the obtaining the video stream data from the N video acquisition devices comprising:

deleting historical video stream data associated with the N video acquisition devices, and associating and storing the N pieces of video stream data and the N video acquisition devices within the video frame switching periodicity, in response to receiving the video stream data transmitted by the N video acquisition devices; and obtaining, in response to that a video frame switching condition indicated by the video frame switching periodicity is satisfied, video stream data that is currently associated with the N video acquisition devices.

3. The method according to claim 1, further comprising:

obtaining device acquisition information and coverage regions corresponding to the N video acquisition devices, and determining a primary device in the N video acquisition devices based on the device acquisition information and the coverage regions corresponding to the N video acquisition devices; and wherein the obtaining the video stream data from the N video acquisition devices comprises:

obtaining video stream data from a video acquisition device other than the primary device in the N video acquisition devices, in response to receiving video stream data transmitted by the primary device.

4. The method according to claim 1, further comprising:

establishing data connections to the N video acquisition devices, and determining, based on data transmission losses corresponding to the data connections and media streaming manners, a target media streaming manner from the media streaming manners; and transmitting the target media streaming manner to the N video acquisition devices; and wherein the obtaining the video stream data from the N video acquisition devices comprises:

obtaining video stream data transmitted by the N video acquisition devices based on the target media streaming manner.

5. The method according to claim 1, wherein the region division information comprises video region locations corresponding to the N video acquisition devices; and the stitching the N pieces of video stream data into the video synthesis picture based on the region division information comprises:

obtaining image data and audio data that are comprised in each piece of video stream data, and stitching the image data comprised in the N pieces of video stream data into a synthetic image based on the video region locations corresponding to the N video acquisition devices;

associating the audio data corresponding to N pieces of image data with the N pieces of image data in the synthetic image, to obtain the video synthesis picture.

6. The method according to claim 1, further comprising:

obtaining image synthesis data and audio synthesis data that form the video synthesis picture;

obtaining d pixels comprised in the image synthesis data and pixel color value information corresponding to each pixel of the d pixels, and obtaining color value difference data between pixel color value information corresponding to every two adjacent pixels in the d pixels, d being a positive integer;

dividing the d pixels into k pixel sets based on the color value difference data between the pixel color value information corresponding to every two adjacent pixels, k being a positive integer less than or equal to d, and pixels comprised in each pixel set being consecutive in the image synthesis data;

forming, by using pixel color value information of a second pixel in each pixel set and color value difference data between a first pixel and a previous pixel of the first pixel, image coded data corresponding to the image synthesis data, the second pixel being a leading pixel in a corresponding pixel set, and the first pixel being a pixel other than the second pixel in each pixel set;

performing audio coding processing on the audio synthesis data, to obtain audio coded data; and transmitting video synthesis coded data formed by the image coded data and the audio coded data to the participating client, to enable the participating client to perform a decoding operation on the video synthesis coded data, to obtain the video synthesis picture.

7. The method according to claim 1, further comprising:

obtaining device acquisition information corresponding to the N video acquisition devices, and determining, based on the device acquisition information corresponding to the N video acquisition devices, device priorities corresponding to the N video acquisition devices;

determining a video synthesis size based on acquisition resolution corresponding to the N video acquisition devices;

determining, based on the device priorities corresponding to the N video acquisition devices and the video synthesis size, video region locations corresponding to the N video acquisition devices;

determining the region division information based on device identifiers corresponding to the N video acquisition devices and the video region locations corresponding to the N video acquisition devices; and transmitting the region division information to the participating client.

8. A video processing method, performed by a participating client, and comprising:

obtaining a video synthesis picture and region division information from a video processing device;

splitting the video synthesis picture into N pieces of video stream data based on the region division information corresponding to video picture synthesis performed by the video processing device, N being a positive integer, the region division information indicating locations of the N pieces of video stream data in the video synthesis picture, the video synthesis picture being obtained by stitching the N pieces of video stream data by the video processing device based on the region division information, the N pieces of video stream data being obtained from N video acquisition devices, and each video acquisition device corresponding to one visual angle, the region division information including N association relationships each associating a device identifier of a respective one of the N video acquisition devices with a corresponding coordinate-based video region location in the video synthesis picture; and performing synchronous rendering on the N pieces of video stream data based on video display region information.

9. The method according to claim 8, further comprising:

obtaining a currently displayed livestreaming page, and obtaining M livestreaming windows comprised in the livestreaming page and livestreaming visual angles corresponding to the M livestreaming windows, M being a positive integer; and determining the video display region information based on video acquisition devices corresponding to the M livestreaming visual angles, the video display region information indicating video acquisition devices corresponding to the M livestreaming windows; and the performing the synchronous rendering on the N pieces of video stream data based on the video display region information comprising:

determining video stream data corresponding to each livestreaming window from the N pieces of video stream data based on the video display region information; and rendering the video stream data corresponding to the livestreaming window in the corresponding livestreaming window based on the video stream data corresponding to each livestreaming window.

10. The method according to claim 9, the M livestreaming windows comprising a primary window and at least one secondary window, each secondary window being a livestreaming window other than the primary window in the M livestreaming windows; and the method further comprising:

switching from displaying of video stream data in the primary window to displaying of video stream data in a first livestreaming window in the at least one secondary window, in response to a primary picture switching request for the first livestreaming window, content displayed in the primary window after the switching being the same as content displayed in the first livestreaming window.

11. The method according to claim 9, further comprising:

obtaining a first video acquisition device corresponding to a second livestreaming window in the N video acquisition devices, in response to a playing request for the second livestreaming window, the second livestreaming window not belonging to the M livestreaming windows; and obtaining video stream data corresponding to the first video acquisition device from the N pieces of video stream data, and outputting the video stream data corresponding to the first video acquisition device in the second livestreaming window.

12. The method according to claim 8, the obtaining the video synthesis picture from the video processing device comprising:

obtaining video synthesis coded data from the video processing device, and obtaining image coded data and audio coded data that form the video synthesis coded data;

obtaining k pixel sets of the image coded data, k being a positive integer;

determining, based on pixel color value information of corresponding second pixels in the k pixel sets and color value difference data between a first pixel and a previous pixel of the first pixel, pixel color value information corresponding to d pixels comprised in the k pixel sets, d being a positive integer greater than or equal to k, the second pixel being the leading pixel in a corresponding pixel set, and the first pixel being a pixel other than the second pixel in each pixel set:

forming image synthesis data by using the pixel color value information corresponding to the d pixels;

performing audio decoding processing on the audio coded data, to obtain audio synthesis data; and forming the video synthesis picture by using the image synthesis data and the audio synthesis data.

13. A non-transitory computer-readable storage medium, storing a computer program, the computer program being applied to be loaded and executed by at least one processor, to enable a computer device that comprises the at least one processor to perform:

obtaining video stream data from N video acquisition devices, N being a positive integer, and each video acquisition device corresponding to one visual angle;

stitching N pieces of video stream data into a video synthesis picture based on region division information for video picture synthesis, the region division information indicating locations of the N pieces of video stream data in the video synthesis picture, the region division information including N association relationships each associating a device identifier of a respective one of the N video acquisition devices with a corresponding coordinate-based video region location in the video synthesis picture; and transmitting the video synthesis picture and the region division information to a participating client, to enable the participating client to split the video synthesis picture into the N pieces of video stream data based on the region division information, and perform synchronous rendering on the N pieces of video stream data based on video display region information corresponding to the participating client.

14. The storage medium according to claim 13, wherein the computer program further causes the at least one processor to perform:

obtaining a video playing frame rate, and determining a video frame switching periodicity based on the video playing frame rate; and the obtaining the video stream data from the N video acquisition devices comprising:

deleting historical video stream data associated with the N video acquisition devices, and associating and storing the N pieces of video stream data and the N video acquisition devices within the video frame switching periodicity, in response to receiving the video stream data transmitted by the N video acquisition devices; and obtaining, in response to that a video frame switching condition indicated by the video frame switching periodicity is satisfied, video stream data that is currently associated with the N video acquisition devices.

15. The storage medium according to claim 13, wherein the computer program further causes the at least one processor to perform:

obtaining device acquisition information and coverage regions corresponding to the N video acquisition devices, and determining a primary device in the N video acquisition devices based on the device acquisition information and the coverage regions corresponding to the N video acquisition devices; and wherein the obtaining the video stream data from the N video acquisition devices comprises:

obtaining video stream data from a video acquisition device other than the primary device in the N video acquisition devices, in response to receiving video stream data transmitted by the primary device.

16. The storage medium according to claim 13, wherein the computer program further causes the at least one processor to perform:

establishing data connections to the N video acquisition devices, and determining, based on data transmission losses corresponding to the data connections and media streaming manners, a target media streaming manner from the media streaming manners; and transmitting the target media streaming manner to the N video acquisition devices; and wherein the obtaining the video stream data from the N video acquisition devices comprises:

obtaining video stream data transmitted by the N video acquisition devices based on the target media streaming manner.

17. The storage medium according to claim 13, wherein the region division information comprises video region locations corresponding to the N video acquisition devices.

18. The storage medium according to claim 17, wherein the stitching the N pieces of video stream data into the video synthesis picture based on the region division information comprises:

obtaining image data and audio data that are comprised in each piece of video stream data, and stitching the image data comprised in the N pieces of video stream data into a synthetic image based on the video region locations corresponding to the N video acquisition devices;

associating the audio data corresponding to N pieces of image data with the N pieces of image data in the synthetic image, to obtain the video synthesis picture.

19. The storage medium according to claim 13, wherein the computer program further causes the at least one processor to perform:

obtaining image synthesis data and audio synthesis data that form the video synthesis picture;

obtaining d pixels comprised in the image synthesis data and pixel color value information corresponding to each pixel of the d pixels, and obtaining color value difference data between pixel color value information corresponding to every two adjacent pixels in the d pixels, d being a positive integer;

dividing the d pixels into k pixel sets based on the color value difference data between the pixel color value information corresponding to every two adjacent pixels, k being a positive integer less than or equal to d, and pixels comprised in each pixel set being consecutive in the image synthesis data;

forming, by using pixel color value information of a second pixel in each pixel set and color value difference data between a first pixel and a previous pixel of the first pixel, image coded data corresponding to the image synthesis data, the second pixel being a leading pixel in a corresponding pixel set, and the first pixel being a pixel other than the second pixel in each pixel set;

performing audio coding processing on the audio synthesis data, to obtain audio coded data; and transmitting video synthesis coded data formed by the image coded data and the audio coded data to the participating client, to enable the participating client to perform a decoding operation on the video synthesis coded data, to obtain the video synthesis picture.

20. The storage medium according to claim 13, wherein the computer program further causes the at least one processor to perform:

obtaining device acquisition information corresponding to the N video acquisition devices, and determining, based on the device acquisition information corresponding to the N video acquisition devices, device priorities corresponding to the N video acquisition devices;

determining a video synthesis size based on acquisition resolution corresponding to the N video acquisition devices;

determining, based on the device priorities corresponding to the N video acquisition devices and the video synthesis size, video region locations corresponding to the N video acquisition devices;

determining the region division information based on device identifiers corresponding to the N video acquisition devices and the video region locations corresponding to the N video acquisition devices; and transmitting the region division information to the participating client.

* * * * *